United States Patent
Payne et al.

(10) Patent No.: US 10,301,903 B2
(45) Date of Patent: May 28, 2019

(54) WELL TREATMENT

(71) Applicant: SCHLUMBERGER TECHNOLOGY CORPORATION, Sugar Land, TX (US)

(72) Inventors: Courtney Payne, Stafford, TX (US); Mohan Kanaka Raju Panga, Sugar Land, TX (US); Stephen Davies, Sugar Land, TX (US); Hassan Chaabouni, Tunis (TN); Xuehao Tan, Sugar Land, TX (US); Chidi Eugene Nwafor, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/155,186

(22) Filed: May 16, 2016

(65) Prior Publication Data
US 2017/0328171 A1    Nov. 16, 2017

(51) Int. Cl.
| | | |
|---|---|---|
| *E21B 43/267* | (2006.01) | |
| *C09K 8/80* | (2006.01) | |
| *E21B 33/138* | (2006.01) | |
| *C09K 8/74* | (2006.01) | |
| *E21B 43/25* | (2006.01) | |
| *C09K 8/516* | (2006.01) | |
| *E21B 43/28* | (2006.01) | |

(52) U.S. Cl.
CPC .......... *E21B 33/138* (2013.01); *C09K 8/516* (2013.01); *C09K 8/74* (2013.01); *E21B 43/25* (2013.01); *E21B 43/28* (2013.01); *C09K 2208/08* (2013.01)

(58) Field of Classification Search
CPC ...... E21B 43/267; E21B 43/26; E21B 43/261; C09K 2208/08; C09K 8/68; C09K 8/80; C09K 8/62; C09K 8/72; C09K 8/74
See application file for complete search history.

(56) References Cited

U.S. PATENT DOCUMENTS

| | | |
|---|---|---|
| 4,848,467 A | 7/1989 | Cantu et al. |
| 4,957,165 A | 9/1990 | Cantu et al. |
| 4,986,355 A | 1/1991 | Casad et al. |
| 5,979,557 A | 11/1999 | Card et al. |
| 6,239,183 B1 | 5/2001 | Farmer et al. |
| 6,435,277 B1 | 8/2002 | Qu et al. |
| 6,506,710 B1 | 1/2003 | Hoey et al. |

(Continued)

FOREIGN PATENT DOCUMENTS

| | | |
|---|---|---|
| WO | 2008050286 A1 | 5/2008 |
| WO | 2012064210 A1 | 5/2012 |

(Continued)

OTHER PUBLICATIONS

Lecerf et al., U.S. Appl. No. 14/790,256, filed Jul. 2, 2015; 40 pages.
(Continued)

*Primary Examiner* — Zakiya W Bates

(57) ABSTRACT

Methods of treating a subterranean formation penetrated by a well bore, by diverting treatment fluid stages from zones of higher permeability to zones of lower permeability with an acid precursor material and fibers. The acid precursor material has an average particle size less than 1000 microns.

19 Claims, 13 Drawing Sheets

(56) References Cited

U.S. PATENT DOCUMENTS

| | | |
|---|---|---|
| 6,640,897 B1 | 11/2003 | Misselbrook et al. |
| 6,667,280 B2 | 12/2003 | Chang et al. |
| 6,703,352 B2 | 3/2004 | Dahayanake et al. |
| 6,949,491 B2 | 9/2005 | Cooke, Jr. et al. |
| 7,032,663 B2 | 4/2006 | Nguyen |
| 7,036,587 B2 | 5/2006 | Munoz, Jr. et al. |
| 7,044,220 B2 | 5/2006 | Nguyen et al. |
| 7,060,661 B2 | 6/2006 | Dobson, Sr. et al. |
| 7,115,546 B2 | 10/2006 | Qu et al. |
| 7,144,844 B2 | 12/2006 | Qu et al. |
| 7,219,731 B2 | 5/2007 | Sullivan et al. |
| 7,220,709 B1 | 5/2007 | Qu et al. |
| 7,265,079 B2 | 9/2007 | Willberg et al. |
| 7,267,170 B2 | 9/2007 | Mang et al. |
| 7,303,018 B2 | 12/2007 | Cawiezel et al. |
| 7,350,572 B2 | 4/2008 | Fredd et al. |
| 7,380,600 B2 | 6/2008 | Willberg et al. |
| 7,482,311 B2 | 1/2009 | Willberg et al. |
| 7,506,689 B2 | 3/2009 | Surjaatmadja et al. |
| 7,510,009 B2 | 3/2009 | Cawiezel et al. |
| 7,550,413 B2 | 6/2009 | Huang et al. |
| 7,565,929 B2 | 7/2009 | Bustos et al. |
| 7,625,846 B2 | 12/2009 | Cooke, Jr. |
| 7,662,753 B2 | 2/2010 | Saini |
| 7,665,517 B2 | 2/2010 | Nguyen et al. |
| 7,673,686 B2 | 3/2010 | Nguyen et al. |
| 7,775,278 B2 | 8/2010 | Willberg et al. |
| 7,934,556 B2 | 5/2011 | Clark et al. |
| 8,016,034 B2 | 9/2011 | Glasbergen et al. |
| 8,043,996 B2 | 10/2011 | Harris |
| 8,109,335 B2 | 2/2012 | Luo et al. |
| 8,167,043 B2 | 5/2012 | Willberg et al. |
| 8,215,385 B2 | 7/2012 | Cooke, Jr. |
| 8,371,384 B2 | 2/2013 | Rickman et al. |
| 8,439,108 B2 | 5/2013 | Cooke, Jr. |
| 8,607,870 B2 | 12/2013 | Gu et al. |
| 8,714,249 B1 | 5/2014 | Tang |
| 8,720,556 B2 | 5/2014 | Todd |
| 8,720,571 B2 | 5/2014 | Dusterhoft |
| 8,726,991 B2 | 5/2014 | Boney |
| 8,727,001 B2 | 5/2014 | Dusterhoft |
| 8,887,803 B2 | 11/2014 | East, Jr. et al. |
| 8,905,133 B2 | 12/2014 | Potapenko et al. |
| 8,936,086 B2 | 1/2015 | Liang et al. |
| 8,973,659 B2 | 3/2015 | Karadkar et al. |
| 9,022,112 B2 | 5/2015 | Chaabouni et al. |
| 9,135,475 B2 | 9/2015 | Lecerf et al. |
| 9,657,557 B2 * | 5/2017 | Bugrin .................. E21B 43/16 |
| 2003/0119680 A1 | 6/2003 | Chang et al. |
| 2004/0129418 A1 | 7/2004 | Jee et al. |
| 2005/0263281 A1 | 12/2005 | Lovell et al. |
| 2008/0093073 A1 | 4/2008 | Bustos et al. |
| 2008/0196896 A1 | 8/2008 | Bustos et al. |
| 2008/0200352 A1 | 8/2008 | Willberg et al. |
| 2008/0280788 A1 | 11/2008 | Parris et al. |
| 2008/0280790 A1 | 11/2008 | Mirakyan et al. |
| 2009/0062157 A1 | 3/2009 | Munoz, Jr. et al. |
| 2010/0018703 A1 | 1/2010 | Lovell et al. |
| 2010/0243251 A1 | 9/2010 | Luharuka et al. |
| 2010/0323932 A1 | 12/2010 | Bustos et al. |
| 2011/0315375 A1 | 12/2011 | Moscato et al. |
| 2012/0000653 A1 | 1/2012 | Panga et al. |
| 2012/0024526 A1 | 2/2012 | Liang et al. |
| 2014/0102695 A1 | 4/2014 | Adil et al. |
| 2014/0116701 A1 | 5/2014 | Tang |
| 2014/0130591 A1 | 5/2014 | Adil et al. |
| 2014/0150546 A1 | 6/2014 | Adil et al. |
| 2014/0151032 A1 | 6/2014 | Adil et al. |
| 2014/0157884 A1 | 6/2014 | Adil et al. |
| 2014/0165715 A1 | 6/2014 | Adil et al. |
| 2014/0231074 A1 | 8/2014 | Adil et al. |
| 2014/0290945 A1 | 10/2014 | Potapenko et al. |
| 2014/0352959 A1 | 12/2014 | Nelson et al. |
| 2015/0075796 A1 | 3/2015 | Lecerf et al. |
| 2015/0252649 A1 | 9/2015 | Tang |
| 2015/0300131 A1 | 10/2015 | Vigderman et al. |
| 2016/0024894 A1 | 1/2016 | Campbell et al. |
| 2017/0002623 A1 * | 1/2017 | Lecerf .................. E21B 33/138 |
| 2017/0328171 A1 | 11/2017 | Payne et al. |
| 2018/0252085 A1 | 9/2018 | Martysevich et al. |

FOREIGN PATENT DOCUMENTS

| | | |
|---|---|---|
| WO | 2012064211 A1 | 5/2012 |
| WO | 2012064212 A1 | 5/2012 |
| WO | 2012064213 A1 | 5/2012 |
| WO | 2016118167 A1 | 7/2016 |

OTHER PUBLICATIONS

International Search Report and Written Opinion issued in International Patent Application No. PCT/US2017/032579 dated May 15, 2017; 16 pages.

\* cited by examiner

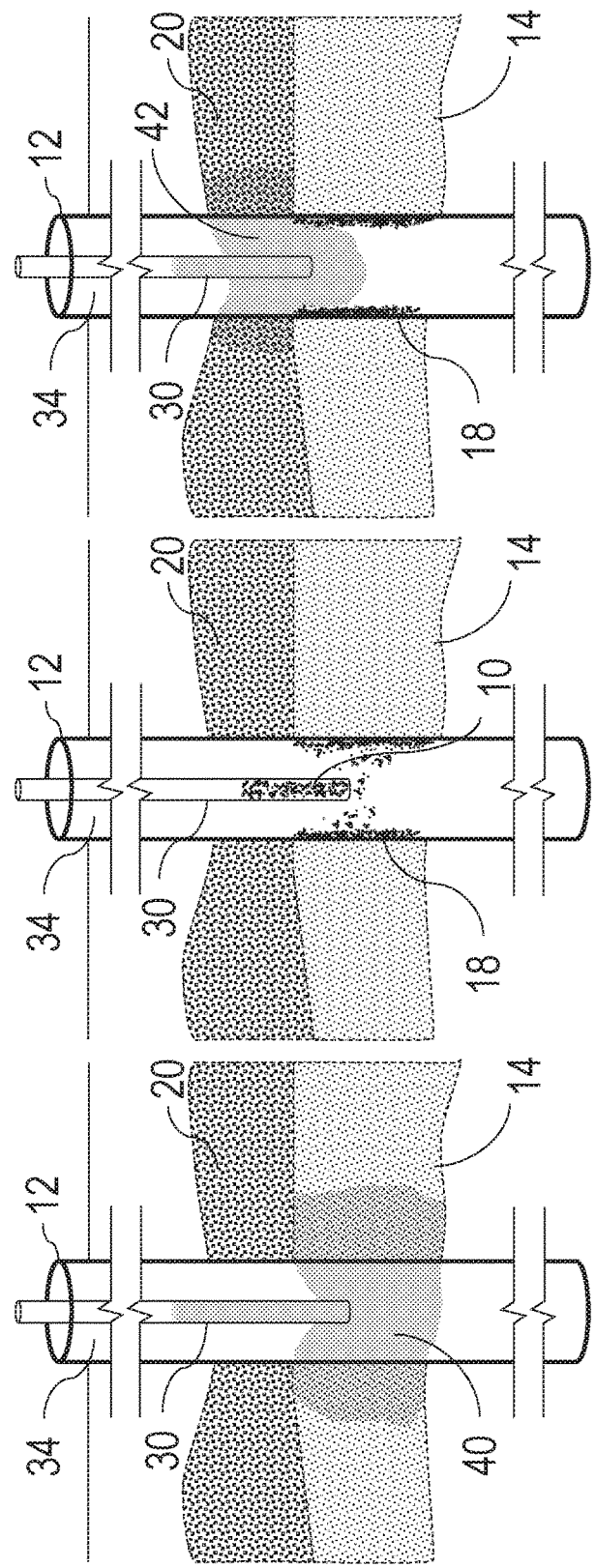

WELL TREATMENT

BACKGROUND

The statements in this section merely provide background information related to the present disclosure and may not constitute prior art.

Some embodiments relate to methods applied to a well bore penetrating a subterranean formation.

Hydrocarbons (oil, condensate, and gas) are typically produced from wells that are drilled into the formations containing them. For a variety of reasons, such as inherently low permeability of the reservoirs or damage to the formation caused by drilling and completion of the well, the flow of hydrocarbons into the well or the well injectivity is undesirably low. In this case, the well is treated with a treatment fluid, which can include fluids for fracturing, diversion, or stimulation to increase the production of oil or gas or to improve well injectivity. For stimulation, the use of acids is frequently employed. Acid fracturing and matrix acidizing are widely used techniques for increasing the production of oil or gas from a well that penetrates an underground carbonate formation, e.g., a limestone or dolomite hydrocarbon bearing formation.

Fines (such as sand) migration can also be an issue, resulting in rapid productivity decline and/or erosion damage to downhole and surface hardware. In such cases, the well can be treated with a treatment fluid, which can include fluids for sand control.

Unwanted water production can result in decreased oil production in a well. In such cases, the well can be treated with a treatment fluid, which can include fluids for water control.

In matrix acidizing treatments, acid is injected at a pressure below the fracture pressure of the formation to remove near wellbore damage and increase productivity in some cases through the creation of vugs and wormholes that extend from the wellbore into the formation. To more fully stimulate a formation with zones of varying permeability, diversion stages are employed to temporarily block areas of higher permeability and send acid to lower permeability zones. The diverter must eventually degrade or be removed to allow the stimulated zones to communicate with the wellbore. This process can be performed multiple times with corresponding acid stages to provide diversion and stimulation of multiple zones in a well. During matrix acidizing treatments, the effectiveness of the diverter relies on how well the diverting material restricts access to the high permeability zones.

In sand control treatments, unconsolidated formation materials are held together by mechanical means such as screens and/or gravel packs, or by chemical means such as resins. This treatment keeps the formation intact during well production to avoid producing materials that might otherwise come free of the formation that might damage or plug equipment. Sand control treatments can be performed on more than one area of a well, e.g., within layers of varying height and permeability. To divert a sand control treatment fluid to less permeable zones of the well, either mechanical devices such as packers, sleeves, or valves or chemical methods may be used.

As an added complexity, treatments performed with coiled tubing require that diverting materials must be able to pass through the coiled tubing string, which may contain a complex flow path, very small exit points, or other constrictions, and/or instruments sensitive to fluid friction or drag. For example, a small deposition of even a partial plug in a coiled tubing might impose sufficient drag on a distributed sensor cable to stretch or break it and ruin the cable. These limitations create an environment that limits the applicability of many diverting materials for delivery through coiled tubing.

As a further complexity, there are difficulties in employing chemical diverting materials in conjunction with mechanical sand control devices because the diverting agents tend to accumulate on the mechanical control devices and cannot adequately divert from the desired zone to be plugged.

The industry would welcome methods to address one or more of the foregoing limitations.

SUMMARY

Embodiments describe methods of treating a subterranean formation penetrated by a well bore are disclosed. The methods provide treatment fluids including degradable material.

In embodiments, disclosed are methods to treat a subterranean formation penetrated by a well bore, comprising pumping a first amount of a treatment fluid in the wellbore into a first zone of the formation; placing a first amount of a first acid precursor material in the wellbore to form a diverting barrier and selectively reduce hydraulic conductivity between the first zone and the wellbore, the first acid precursor having a first average particle size of about 1000 microns or less (or 2-100 microns or 3-50 microns or 5-20 microns); pumping a second amount of the first treatment fluid in the wellbore; diverting the second amount of the first treatment fluid from the first zone to a second zone; and at least partially restoring the hydraulic conductivity between the first zone and the wellbore through at least the partial removal of the diverting barrier.

In some embodiments of these methods, fibers are placed in the wellbore with the first acid precursor material, the fibers having a length of from about 20 nm to about 10 mm and a diameter of from about 5 nm to about 100 µm; or the fibers can have a length from about 1 mm to about 10 mm or from about 1 mm to about 6 mm or from about 1 mm to about 3 mm and a diameter from about 1 µm to about 100 µm or from about 1 µm to about 50 µm or from about 1 µm to about 25 µm; or the fibers can have a length from about 20 nm to about 1 mm or from about 50 nm to about 1 mm or from about 100 nm to about 1 mm and a diameter from about 5 nm to about 1 µm or from about 5 nm to about 500 nm or from about 5 nm to about 50 nm. In some embodiments, the fibers are placed in the wellbore in a fluid at a concentration of from about 0.12 to 18 g/m$^3$ (about 1 to 150 ppt). In some embodiments, the fibers comprise a second acid precursor material.

In further embodiments, disclosed are methods to treat a subterranean formation penetrated by a well bore, comprising providing a first treatment fluid; pumping a plurality of stages of the first treatment fluid in the wellbore into a plurality of respective zones of the formation; providing a second treatment fluid comprising a carrier fluid, an acid precursor material having a first average particle size of about 1000 microns or less (or 2-100 microns or 3-50 microns or 5-20 microns), and fibers; alternately pumping in the wellbore respective stages of the second treatment fluid between sequentially preceding and subsequent ones of the stages of the first treatment fluid to form diverting barriers to reduce hydraulic conductivity between respective preceding and subsequent ones of the zones and the wellbore; diverting the subsequent ones of the first treatment fluid stages from a respective preceding zone to a respective subsequent zone; and after a final stage of the second treatment fluid, pumping a final stage of the first treatment fluid in the wellbore of the formation and diverting the final stage of the first treatment fluid to a final one of the zones; and at least partially restoring the hydraulic conductivity between at least one of the plurality of zones and the wellbore through at least the partial removal of at least one of the diverting barriers.

In some embodiments of these methods, the second treatment fluid further comprises fibers having a length from about 20 nm to about 10 mm and a diameter of from about 5 nm to about 100 μm; or the fibers can have a length from about 1 mm to about 10 mm or from about 1 mm to about 6 mm or from about 1 mm to about 3 mm and a diameter from about 1 μm to about 100 μm or from about 1 μm to about 50 μm or from about 1 μm to about 25 μm; or the fibers can have a length from about 20 nm to about 1 mm or from about 50 nm to about 1 mm or from about 100 nm to about 1 mm and a diameter from about 5 nm to about 1 μm or from about 5 nm to about 500 nm or from about 5 nm to about 50 nm. In some embodiments, the fibers are present in the second treatment fluid at a concentration of from about 0.12 to 18 g/m$^3$ (about 1 to 150 ppt). In some embodiments, the fibers comprise a second acid precursor material.

BRIEF DESCRIPTION OF THE DRAWINGS

FIG. 3A schematically shows treatment of a high permeability zone according to some embodiments of the present disclosure.

FIG. 3B schematically shows delivery of a diversion stage to the treated high permeability zone of FIG. 3A according to some embodiments of the present disclosure.

FIG. 3C schematically shows treatment of the low permeability zone of FIGS. 3A and 3B according to some embodiments of the present disclosure.

DETAILED DESCRIPTION

Figure 1:
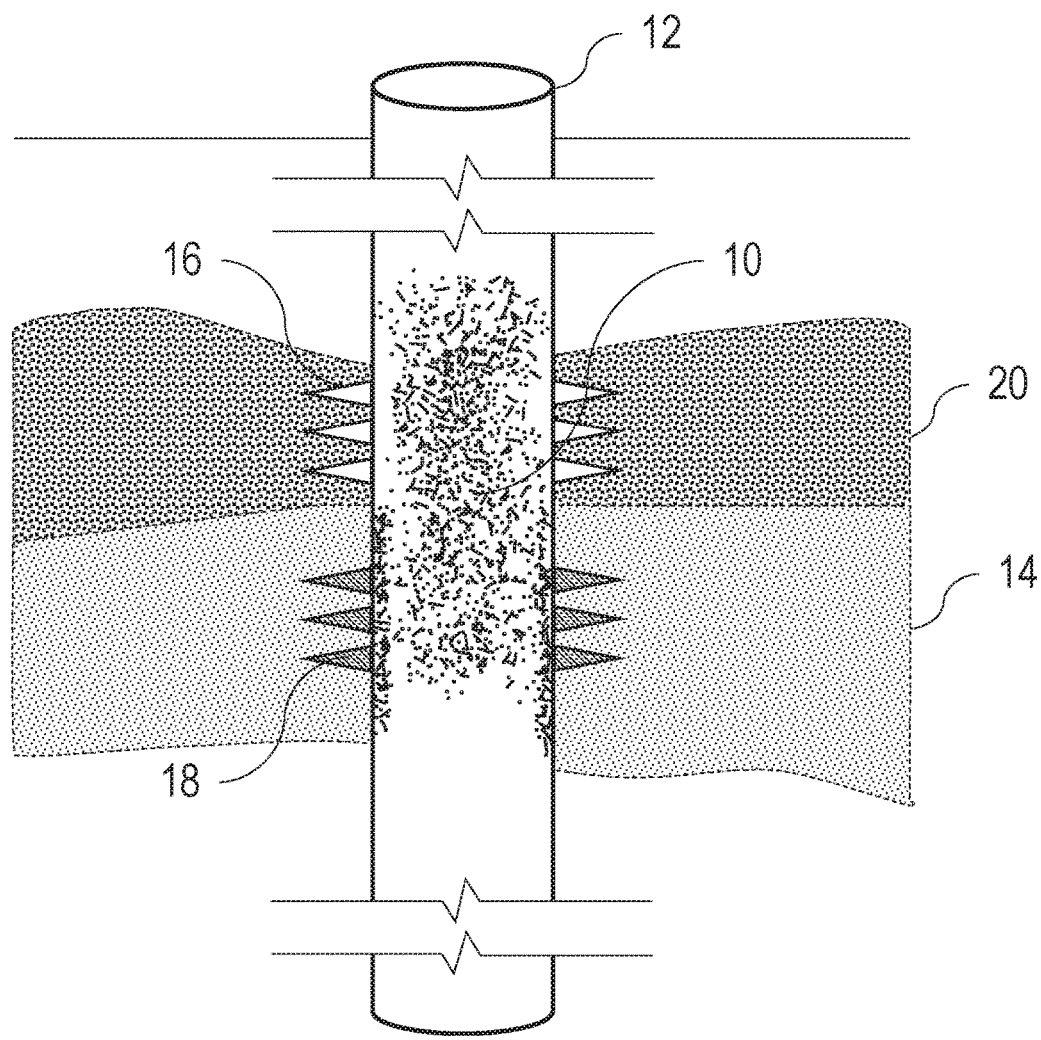
FIG. 1 schematically shows a mixture of acid precursor particulates and fibers delivered in a wellbore to a high permeability zone according to some embodiments of the present disclosure.

At the outset, it should be noted that in the development of any actual embodiments, numerous implementation-specific decisions must be made to achieve the developer's specific goals, such as compliance with system and business related constraints, which can vary from one implementation to another. Moreover, it will be appreciated that such a development effort might be complex and time consuming but would nevertheless be a routine undertaking for those of ordinary skill in the art having the benefit of this disclosure.

The description and examples are presented solely for the purpose of illustrating some embodiments and should not be construed as a limitation to the scope and applicability. In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and the inventor to be in possession of the entire range and all points within the range disclosed and to have enabled the entire range and all points within the range.

The following definitions are provided in order to aid those skilled in the art in understanding the detailed description.

The term "treatment", or "treating", refers to any subterranean operation that uses a fluid in conjunction with a desired function and/or for a desired purpose. The term "treatment", or "treating", does not imply any particular action by the fluid.

As used herein, "ppt" means pounds per thousand U.S. gallons of treatment fluid, and the conversion is 1 ppt=0.12 g/m$^3$.

The term "fracturing" refers to the process and methods of breaking down a geological formation and creating a fracture, i.e. in the rock formation around a well bore, by pumping fluid at very high pressures (pressure above the determined closure pressure of the formation).

The term "matrix treatment" refers to introducing the treatment fluid into the formation matrix at a pressure below the fracturing pressure. Matrix treatment with a treatment fluid comprising an acidic carrier is referred to as "matrix acidizing".

The term "particulate" or "particle" refers to a solid 3D object with maximal dimension significantly less than 1 meter. Here "dimension" of the object refers to the distance between two arbitrary parallel planes, each plane touching the surface of the object at least one point. The maximal dimension refers to the biggest distance existing for the object between any two parallel planes and the minimal dimension refers to the smallest distance existing for the object between any two parallel planes. In some embodiments, the particulates used are with a ratio between the maximal and the minimal dimensions (particle aspect ratio x/y) of less than 5 or even of less than 3.

The term "fiber" refers to a solid 3D object having a thickness substantially smaller than its other dimensions, for example its length and width. Fiber aspect ratios (diameter/thickness, width/thickness, etc.) may be greater than or equal to about 6 and in some embodiments greater than or equal to about 10.

The term "coiled tubing" refers to a long, continuous length of pipe wound on a spool. The pipe is straightened prior to pushing into a wellbore and rewound to coil the pipe back onto the transport and storage spool. Depending on the pipe diameter, e.g., 2.5 cm to 11.4 cm (1 in. to 4½ in.), and the spool size, coiled tubing can range from 610 m to 4,570 m (2,000 ft to 15,000 ft) or greater length.

The term "permeability" refers to the ability or measurement of a porous medium to transmit fluids, and may be reported in darcies or millidarcies. "Hydraulic conductivity"/-diverting For the purposes of the disclosure, particles may be non-homogeneous which shall be understood in the context of the present disclosure as made of at least a continuous phase of degradable material containing a discontinuous phase of a discontinuous material such as a stabilizer or a hydrolysis accelerator. Non-homogeneous in the present disclosure also encompasses composite materials also sometimes referred to as compounded material. The non-homogeneous particles may be supplemented in the fluid with further homogeneous structure.

The terms "particle size", "particulate size" and similar terms refer to the diameter (D) of the smallest imaginary circumscribed sphere that includes such particulate particle.

The term "average size" refers to an average size of solids in a group of solids of each type. In each group j of particles average size can be calculated as mass-weighted value $$\overline{L}_j = \frac{\sum_{i=1}^{N} l_i m_i}{\sum_{i=1}^{N} m_i}$$

Where N—the number of particles in the group, $l_i$, (i= 1 . . . N)—sizes of individual particles or flakes; (i= 1 . . . N)—masses of individual particles or flakes.

While the embodiments described herewith refer to well treatment it is equally applicable to any well operations where zonal isolation is required such as drilling operations, workover operations, etc.

The disclosure pertains to methods to divert treatment fluids and selectively treat formation zones, e.g., increasing the permeability of formation zones during well treatment, such as, for example, matrix acidizing. The treatment fluids may be pumped in stages that sequentially aim at improving the selectivity of the matrix treatment zones.

Other applications can include water control or sand control, which keeps unwanted water and sand, respectively, from being produced.

In embodiments, the disclosure pertains to methods to selectively treat the matrix of formation zones, e.g., to maximize the permeability of formation zones during well treatment such as for example matrix acidizing. The treatment fluids may be pumped in stages which sequentially aim at matrix treatment of different zones of the formation near the wellbore, e.g., in a sequence of treating and diverting from zones of higher permeability to zones of decreasing permeability.

Without wishing to be bound by any theory, the inventors believe that, in some embodiments, an engineered combination of relatively short, high-aspect-ratio fibrous materials and relatively small particulate materials synergistically plugs or blocks the flow of fluids in the near wellbore area of higher permeability zones. For example, used alone, to function as a diverter, the fibrous materials may require an excessively large filter cake that might exceed the diameter of the wellbore, whereas the particulate materials could virtually disappear in larger openings in the formation, such as fractures or perforation tunnels, and fail to divert near the wellbore. The present disclosure aims at such synergistic combinations of particles and fibers.

The following disclosure is generally in the context of embodiments using a combination of a particulate acid precursor material and fibers.

In one aspect, the disclosure relates to a method to treat a subterranean formation penetrated by a well bore, comprising: (a) pumping a first amount of a treatment fluid in the wellbore into a first zone of the subterranean formation; (b) placing fibers and a first amount of a first acid precursor material in the wellbore to form a diverting barrier and selectively reduce hydraulic conductivity between the first zone and the wellbore, the fibers can have a length from about 20 nm to about 10 mm and a diameter of from about 5 nm to about 100 μm; or the fibers can have a length from about 1 mm to about 10 mm or from about 1 mm to about 6 mm or from about 1 mm to about 3 mm and a diameter from about 1 μm to about 100 μm or from about 1 μm to about 50 μm or from about 1 μm to about 25 μm; or the fibers can have a length from about 20 nm to about 1 mm or from about 50 nm to about 1 mm or from about 100 nm to about 1 mm and a diameter from about 5 nm to about 1 μm or from about 5 nm to about 500 nm or from about 5 nm to about 50 nm, and the first acid precursor can have a first average particle size of about 1000 microns or less (or 2-100 or 3-50 or 5-20 microns); (c) pumping a second amount of the first treatment fluid in the wellbore; (d) diverting the second amount of the first treatment fluid from the first zone to a second zone; and (e) at least partially restoring the hydraulic conductivity between the first zone and the wellbore through at least the partial removal of the diverting barrier.

In some embodiments, the placement of the fibers and the acid precursor material (in step (b)) comprises pumping in the wellbore a slurry comprising a fluid carrier, one or a combination of the fibers, the first acid precursor material, and a component selected from the group consisting of: (1) a viscoelastic surfactant system, (2) a viscosifying agent (3) an acid, (4) or combinations thereof.

In some embodiments, the placement of the fibers and the acid precursor material (in step (b)) comprises deploying a coiled tubing assembly in the well and wherein a slurry of one or a combination of the fibers and the first acid precursor material is pumped through a flow path defined by the coiled tubing. In embodiments, the fibers, as described above, are present in the slurry at a concentration of from about 0.12 to 18 g/m$^3$ (about 1 to 150 ppt). In embodiments, a coiled tubing assembly comprises the coiled tubing as described herein and a fiber optic tether disposed in the flow path of the coiled tubing, and the method can further comprise taking distributed measurements from the fiber optic tether during one or more of: i) the pumping of the first amount of the treatment fluid, ii) the pumping of the second amount of the treatment fluid, iii) the pumping of the slurry, iv) the diversion of the second amount of the first treatment fluid, and v) the at least partial restoring of the hydraulic conductivity between the first zone and the wellbore through at least the partial removal of the diverting barrier, to observe the behavior of the treatment fluids or the diverting barrier placed in the subterranean formation. In embodiments, the coiled tubing assembly can further comprise a coiled tubing tool attached to the coiled tubing, and measurements can be taken from the coiled tubing tool during each of i)-v) set out above to observe the behavior of the treatment fluids or the diverting barrier placed in the subterranean formation.

In some embodiments, the placement of the fibers and the acid precursor material (in step (b)) comprises pumping a slurry comprising a mixture of the fibers and the first acid precursor material.

In some embodiments, the placement of the fibers and the acid precursor material (in step (b)) comprises pumping a treatment stage comprising alternating slugs of a first slurry comprising the first acid precursor material (e.g., without or in the substantial absence of the fibers) alternated with a second slurry comprising the fibers (e.g., without or in the substantial absence of the first acid precursor material).

In some embodiments, the method further comprises pumping the first amount of the first acid precursor material (in step (b)) through a screen, a gravel pack, or the like, or a combination thereof. For example, the screen may have openings larger than the first average particle size, e.g., 50% larger or 2 times as large or 2.5 times as large or 3 times as large, or otherwise sufficiently large to permit passage of the first acid precursor material. In some embodiments, at least a first portion of the first amount of the first acid precursor material can be pumped first through the screen, gravel pack, or other mechanical device, followed by pumping the fibers alone or in combination with a second portion of the first amount of the fibers to the mechanical device.

In some embodiments, the placement of the fibers and the acid precursor material (in step (b)) comprises deploying a coiled tubing assembly in the well and wherein a first slurry of the first acid precursor material is pumped through a flow path defined by the coiled tubing, and pumping a second slurry of the fibers in an annulus between the wellbore and the coiled tubing.

In some embodiments, the fibers and the acid precursor material are placed in the wellbore (in step (b)) simultaneously with the first amount of the treatment fluid.

In some embodiments, the method further comprises pumping the first amount of the first acid precursor material (in step (b)) in a perforation, or an open hole or a cased hole or through a slotted liner, and combinations thereof.

In some embodiments, the treatment fluid (in steps (a) and (c)) comprises any sand control fluid, e.g., a fluid comprising resin, sand conglomeration chemicals such as but not limited to a zeta potential modifying fluid, fines migration chemicals, and combinations thereof.

In some embodiments, the treatment fluid (in steps (a) and (c)) comprises an acidizing fluid, e.g., the treatment fluid comprises an acidic carrier fluid.

In some embodiments, the method further comprises deploying a coiled tubing assembly in the well and wherein the first amount of the first acid precursor material is pumped (in step (b)) through a flow path defined by the coiled tubing. For example, the placement of the fibers and the first acid precursor can comprise pumping both of the first acid precursor material and the fibers, either together as a mixture or separately as alternating slugs, or pumping a slurry of the first acid precursor material through a coiled tubing, and pumping a slurry of the fibers in an annulus between the wellbore and the coiled tubing.

In these or any other embodiments, the fibers (in step (b)) have a length less than 3 mm and an aspect ratio of at least 10, and/or the first acid precursor material has an average size in the range of 5 to 20 microns, including in any of the foregoing embodiments wherein the first acid precursor material and/or the fibers are pumped through and/or to a screen, gravel pack, perforation, coiled tubing, or the like. In some embodiments, the fibers are present in the second treatment fluid (in step (b) at a concentration of from about 0.12 to 18 g/m$^3$ (about 1 to 150 ppt).

In some embodiments, the first acid precursor material (in step (b)) has a multimodal particle size distribution. The first acid precursor material can have 2-5 or at least 2 or at least 3 or at least 4 or up to 5 particle size ranges. For a multimodal system, at least one size can be from 1-50 or from 1-40 or from 1-20 microns, and at least one size can be from 50-1000 or 50-100 or 100-200 or 200-1000 microns, or any combination thereof. For example, the first acid precursor can have a first particle size distribution between 5 and 20 microns, e.g., 5-10 microns, and a second particle size distribution between about 1.6 and 20 times larger than the first particle size distribution. Further, the first acid precursor material, may comprise 3, 4, 5 or more modes, e.g., where each successively larger mode is between about 1.6 and 20 times larger than the next smaller mode.

In some embodiments, the fibers (in step (b)) comprise or consist essentially of a second acid precursor material, or a non-degradable material.

In some embodiments, the first and second (if present) acid precursor materials (in step (b)) are selected from the group consisting of polylactic acid, polyglycolic acid, copolymers of lactic and glycolic acids, and the like, and combinations thereof.

In some embodiments, the method further comprises pumping respective spacer stages between stages of the treatment fluid (in steps (a) and (c)) and stages for the placement of the fibers and the first acid precursor material (in step (b)).

In another aspect, the present disclosure provides method to treat a subterranean formation penetrated by a well bore, comprising: (1) providing a first treatment fluid; (2) pumping a plurality of stages of the first treatment fluid in the wellbore into a plurality of respective zones of the formation; (3) providing a second treatment fluid comprising a carrier fluid, an acid precursor material having a first average particle size of about 1000 microns or less (or 2-100 or 3-50 or 5-20 microns), and fibers which can have a length of about 10 mm or less and an aspect ratio of at least about 6 (or a length of 3 mm or less and an aspect ratio of at least 10); (4) alternately pumping in the wellbore respective stages of the second treatment fluid between sequentially preceding and subsequent ones of the stages of the first treatment fluid to form diverting barriers, or at least one diverting barrier, to reduce hydraulic conductivity between respective preceding and subsequent ones of the zones and the wellbore; (5) diverting the subsequent ones of the first treatment fluid stages from a respective preceding zone to a respective subsequent zone; (6) after a final stage of the second treatment fluid, pumping a final stage of the first treatment fluid in the wellbore of the formation and diverting the final stage of the first treatment fluid to a final one of the zones; and (7) at least partially restoring the hydraulic conductivity between at least one of the plurality of zones and the wellbore through at least the partial removal of at least one of the diverting barriers.

In some embodiments, the method comprises deploying a coiled tubing assembly in the well and wherein at least the second treatment fluid stages (in step (4)) are pumped through a flow path defined by the coiled tubing. In embodiments, a coiled tubing assembly comprises the coiled tubing as described herein and a fiber optic tether disposed in the flow path of the coiled tubing, and the method can further comprise taking distributed measurements from a fiber optic tether during one or more of: i) pumping a plurality of stages of the first treatment fluid ii) the pumping of the respective stages of the second treatment fluid, iii) the diverting of the subsequent ones of the first treatment fluid stages, and iv) the at least partial restoring of the hydraulic conductivity between at least one of the plurality of zones and the wellbore through at least the partial removal of at least one of the diverting barriers, to observe the behavior of the treatment fluids or the diverting barrier placed in the subterranean formation. In embodiments, the coiled tubing assembly can further comprise a coiled tubing tool attached to the coiled tubing, and measurements can be taken from the coiled tubing tool during each of i)-iv) set out above to observe the behavior of the treatment fluids or the diverting barrier placed in the subterranean formation.

In some embodiments, the method comprises pumping the second treatment fluid (in step (4)) through a screen, a gravel pack, or a combination thereof.

In some embodiments, the first treatment fluid (in steps (1) and (2)) comprises any sand control fluid, e.g., a fluid comprising resin, sand conglomeration chemicals such as but not limited to a zeta potential modifying fluid, fines migration chemicals, and combinations thereof.

In some embodiments, the first treatment fluid (in steps (1) and (2)) comprises an acidizing fluid, e.g., the first treatment fluid comprises an acidic carrier fluid.

With reference to the drawings, in which like elements are indicated by like numbers, FIG. 1 schematically shows a mixture 10 of acid precursor particulates and fibers delivered in a wellbore 12 to a high permeability zone 14, which may have been previously treated with a treatment fluid. The wellbore 12 can optionally be provided with perforations 16 in the embodiment illustrated, as well as any embodiments illustrated in FIGS. 2A to 3D. The carrier fluid from the mixture 10 enters the high permeability zone 14, depositing a fiber-particle filter cake that forms a plug 18 in perforation 16 to reduce permeability and hydraulic conductivity between the zone 14 and the wellbore 12. The next treatment fluid stage is then diverted from zone 14 to low permeability zone 20, i.e., the next highest permeability zone.

Figure 2A:
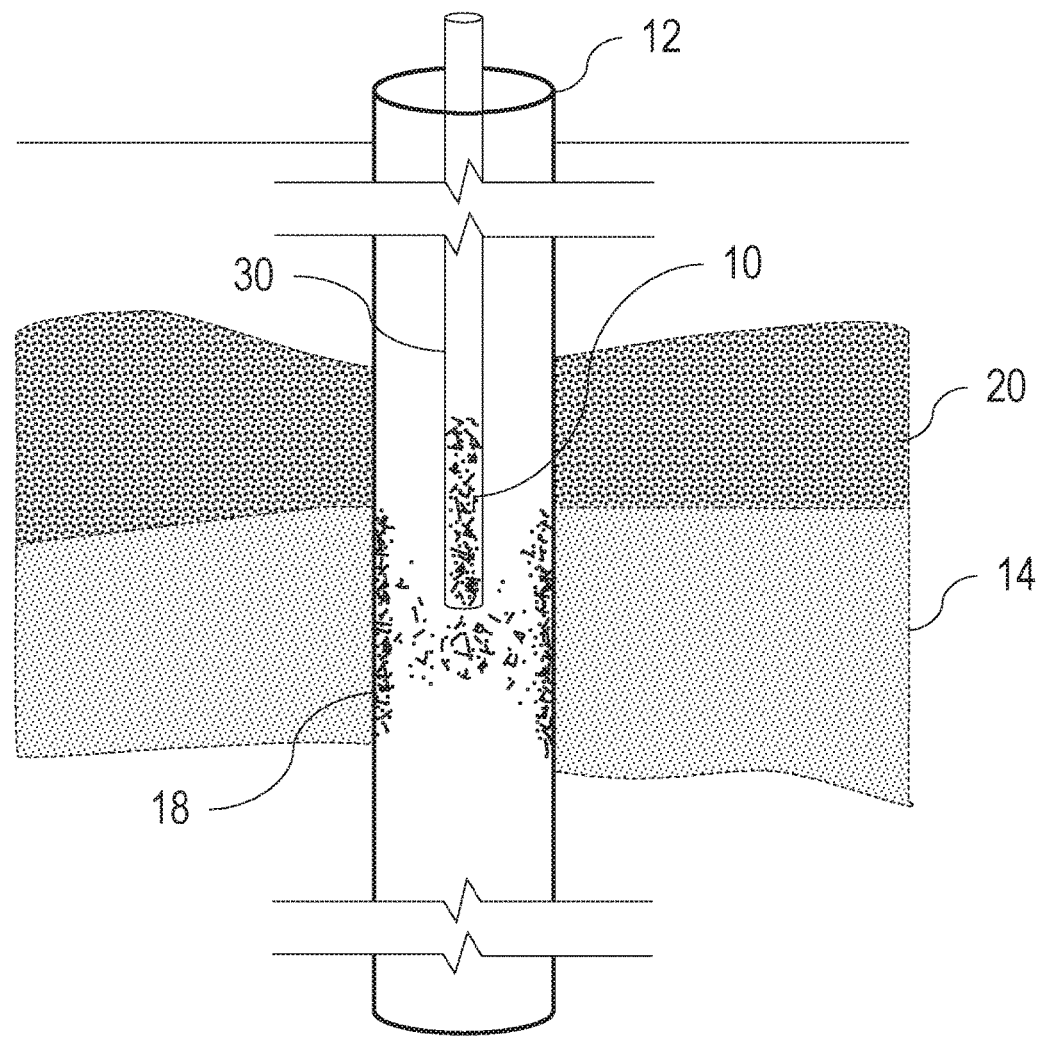
FIG. 2A schematically shows a mixture of acid precursor particulates and fibers delivered through coiled tubing to a high permeability zone according to some embodiments of the present disclosure.

FIG. 2A schematically shows the mixture 10 of acid precursor particulates and fibers delivered to high permeability zone 14 as in FIG. 1, except that the mixture is delivered through coiled tubing 30. The plug 18 diverts treatment fluid from zone 14 to zone 20.

Figure 2B:
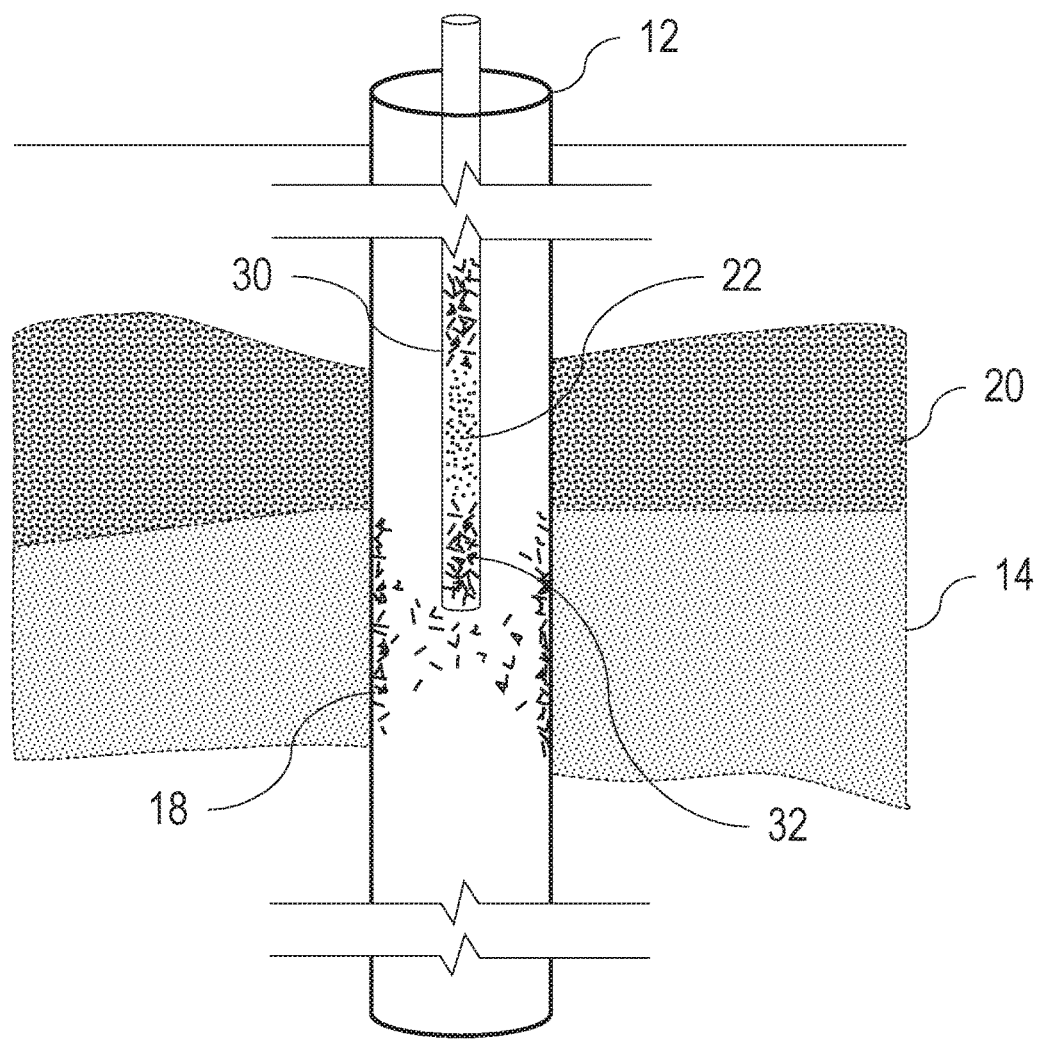
FIG. 2B schematically shows acid precursor particulates and fibers sequentially delivered through coiled tubing to a high permeability zone according to some embodiments of the present disclosure.

FIG. 2B schematically shows alternating slugs of acid precursor particulates 22 and fibers 32 sequentially delivered through the coiled tubing 30 to the high permeability zone 14 to form plug 18 and divert treatment fluid to zone 20.

Figure 2C:
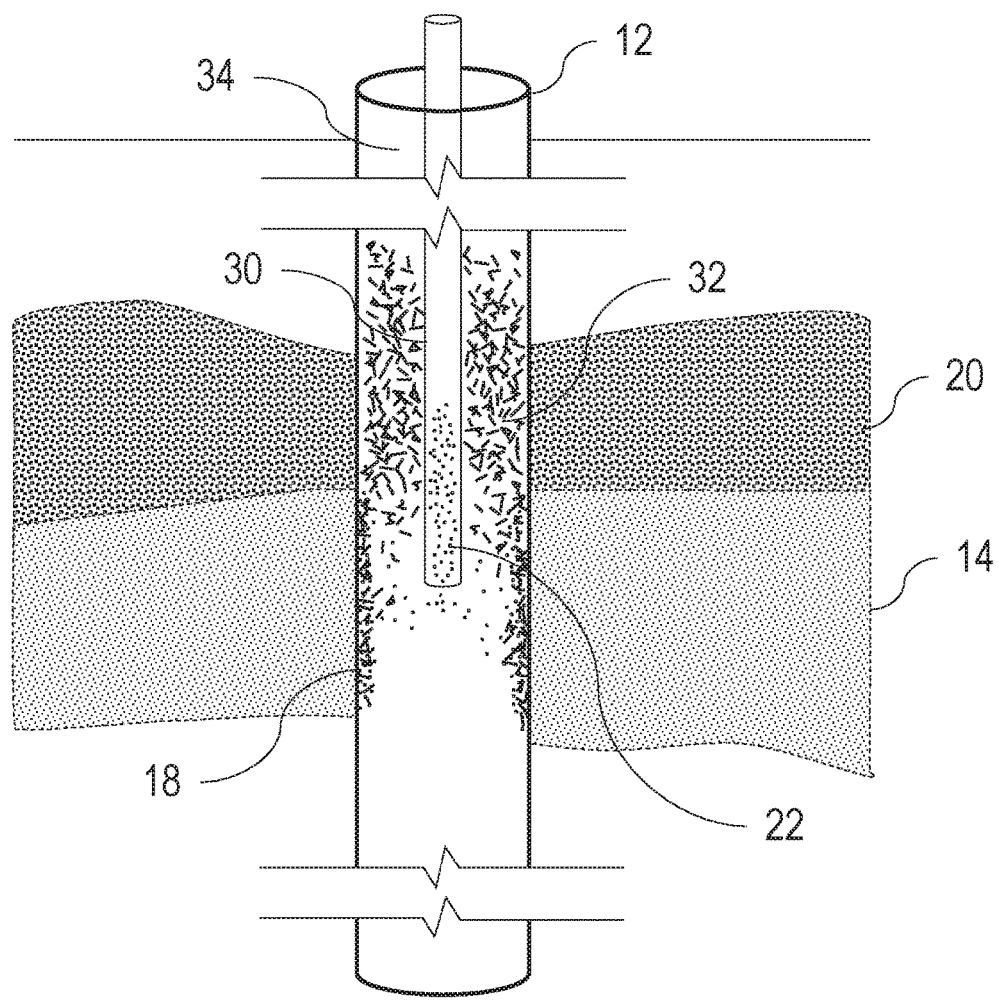
FIG. 2C schematically shows acid precursor particulates delivered through coiled tubing and fibers delivered through wellbore annulus to a high permeability zone according to some embodiments of the present disclosure.

FIG. 2C schematically shows acid precursor particulates 22 delivered through coiled tubing 30 and fibers 32 delivered through the annulus 34 between the coiled tubing 30 and the wellbore 12 to the high permeability zone 14 to form plug 18 and divert treatment fluid to zone 20.

FIG. 3A schematically shows treatment of high permeability zone 14 with a treatment fluid 40, which may be a matrix sand control fluid, a matrix acidizing treatment fluid, etc. The treatment fluid 40 can be delivered through the coiled tubing 30.

FIG. 3B schematically shows placement of a diversion stage of a mixture 10 of the particulates and fibers to the treated high permeability zone 14 of FIG. 3A, as in FIG. 2A above.

FIG. 3C next shows treatment of the low permeability zone 20 with a treatment fluid 42 being diverted from zone 14 at the plug 18.

Figure 3D:
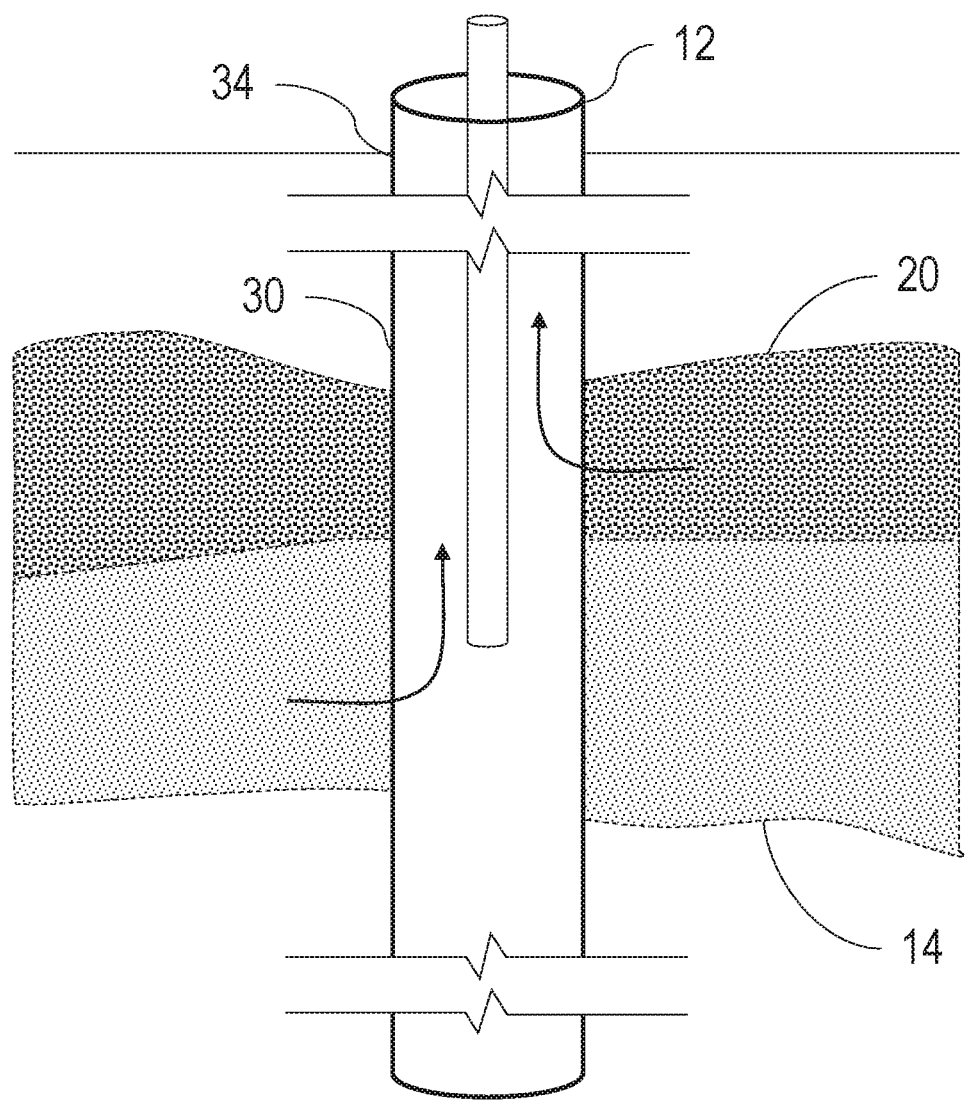
FIG. 3D schematically shows production from the treated zones of FIG. 3C after degradation of the diverter plug according to some embodiments of the present disclosure.

FIG. 3D shows production from the treated zones 14, 20 of FIG. 3C after degradation of the diverter plug 18 (FIGS. 3B and 3C).

Figure 4A:
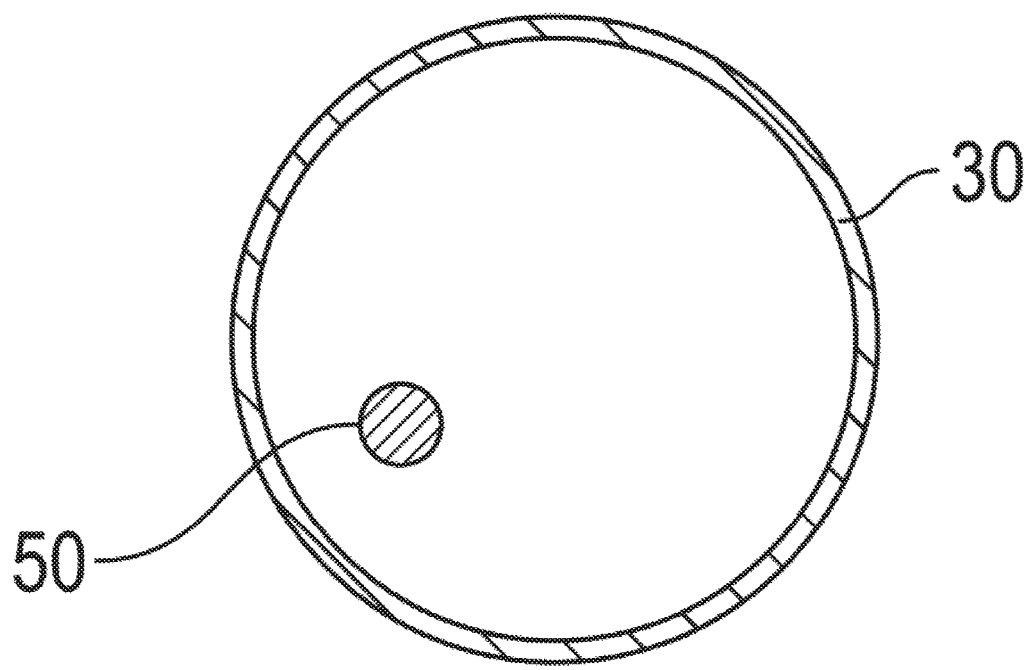
FIG. 4A is a plan view of a coiled tubing with a fiber optic tether, according to some embodiments of the present disclosure.
Figure 4B:
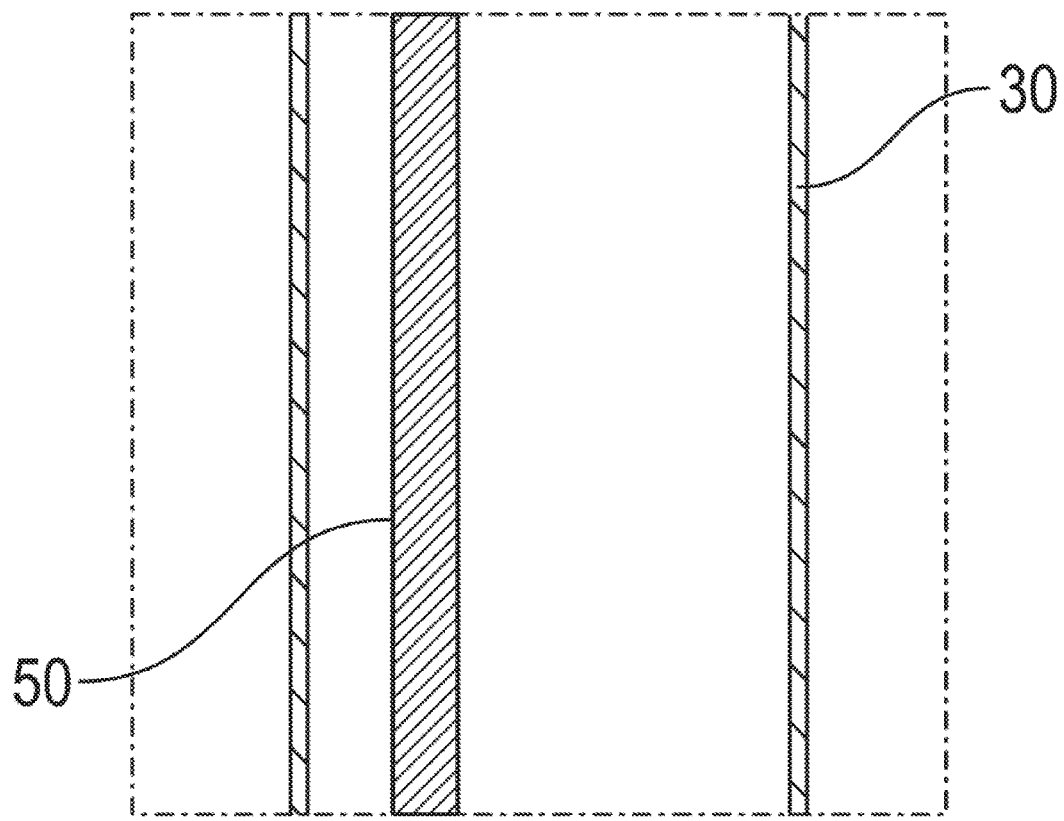
FIG. 4B is a vertical sectional view of the coiled tubing and fiber optic tether shown in FIG. 4A.

FIGS. 4A and 4B show a coiled tubing 30 with a fiber optic tether 50, which may be present in any embodiments described herein, regardless of whether the coiled tubing 30 is present. Fiber optic tether 50 uses optical time-domain reflectometry to obtain temperature, pressure, vibration, and the like, readings along the length of the fiber optic tether. Other properties that can be determined with fiber optic tethers include pressure, fluid flow, acidity, viscosity, resistivity, composition, etc. The fiber optic tether can be placed in the coiled tubing 30 in the central passageway thereof, or attached or embedded in a wall of the tubing. Temperature, pressure or vibration changes can be used to indicate fluid flow locations in real time, and thus zones of the well that are receiving the treatment fluid. More information regarding distributed sensors, such as fiber optic tethers, and their configuration and use in wellbores and/or coiled tubing is available in US2004/0129418; US2014/0102695; US2014/0130591; US2014/0150546; US2014/0151032; US2014/0157884; US2014/0165715; US2014/0231074; US2011/0315375; US2005/0263281; all of which are hereby incorporated herein by reference in their entireties.

Figure 5:
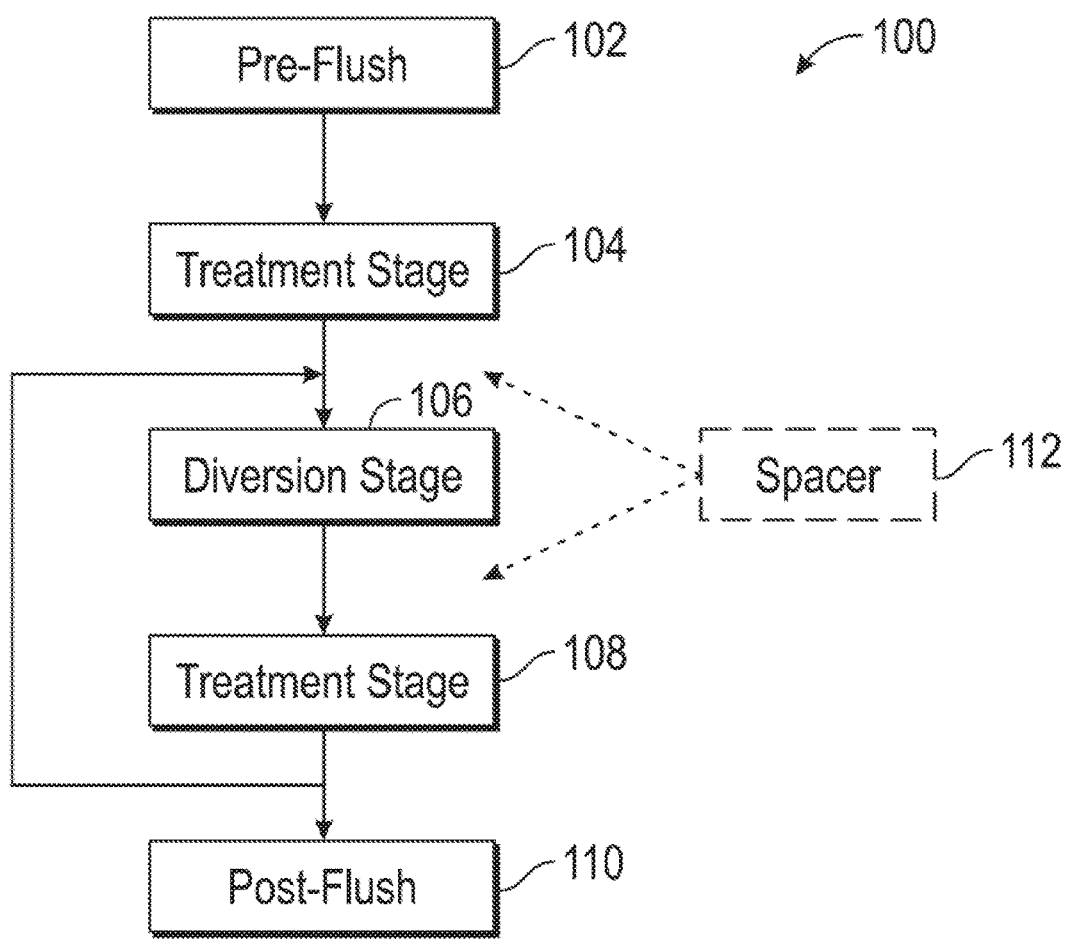
FIG. 5 is a block flow diagram for treatment methods according to some embodiments of the present disclosure.

FIG. 5 is a block flow diagram 100 for treatment methods and/or systems shown according to any of FIGS. 1A to 4B. In an initial step 102, a pre-flush stage is pumped into the wellbore. Next, in step 104, a treatment fluid stage is pumped to the highest permeability zone. After pumping the diversion stage in step 106, another fluid treatment stage is pumped in step 108 to the next highest permeability zone. Steps 106 and 108 are then optionally repeated one or more times until all the zones desired to be treated have been treated and a final post-flush stage is pumped in step 110. If desired, a spacer can be pumped in step 112 to separate the treatment fluid stages from the diversion stages. Also, in accordance with an embodiment, the diversion stage 106 can be pumped simultaneously with, and in some cases as a part of, the treatment fluid stage 104.

Main Treatment Fluid

The treatment fluids may be any treatment fluid, including sand control fluids, acidizing fluids, water control fluids, fracturing fluids, and the like, also referred to herein as the "main treatment fluid", "first treatment fluid", or similar designation. The modifiers "main" and "first" do not necessarily indicate any particular importance, order, or relative characteristic, and are used herein solely to distinguish other treatment fluids from the diverter treatment fluids described herein.

The main treatment fluids herein generally comprise a carrier and one or more treating or other agents in various embodiments, depending on the desired treatment to be effected.

The carrier fluid used in the first treatment fluid can be acidic or non-acidic in various embodiments, depending on the desired treatment to be effected. The carrier fluid may be water: fresh water, produced water, seawater. Other non-limiting examples of carrier fluids include hydratable gels (e.g. guars, polysaccharides, xanthan, hydroxy-ethyl-cellulose, etc.), a cross-linked hydratable gel, an energized fluid (e.g. an N2 or CO2 based foam), and an oil-based fluid including a gelled, foamed, or otherwise viscosified oil. Additionally, the carrier fluid may be a brine, and/or may include a brine.

In some embodiments, the treatment fluid is a sand control fluid. Sand control fluids contain one or more agents designed to consolidate or otherwise inhibit the migration of solids in or from the formation to which they are applied. Unconsolidated formations are common in sandstone, for example. In some embodiments, the carrier fluid for the sand control stage is non-acidic (pH>6.5). In some embodiments, the sand control agent comprises a resin, such as disclosed in US 2015/030013; U.S. Pat. No. 7,673,686; US 2015/0252649; each of which is hereby incorporated herein by reference. Additionally, the sand control fluid may also comprise hardeners, crosslinkers, curing agents, accelerators, retarders, and the like which modulate the resin curing. For example, the sand control fluid stage may comprise split stages in which a first part of the stage comprises the resin, and a later part of the stage comprises a hardener, or vice versa. The split stages may also include a spacer between the first and second parts of the sand control stage.

In some embodiments, the treatment fluid is a matrix acidizing fluid. Matrix acidizing is employed primarily in acid-reactive formations such as limestone or dolomite, but may also be used in other types of formations, e.g., to clean up near wellbore damage. In matrix acidizing, an acidic carrier fluid is used. Acids employed to reduce the pH of the acidizing fluid can include mineral and/or organic acids such as hydrochloric acid, hydrofluoric acid, ammonium bifluoride, formic acid, acetic acid, lactic acid, glycolic acid, maleic acid, tartaric acid, sulfamic acid, malic acid, citric acid, methyl-sulfamic acid, chloro-acetic acid, an amino-poly-carboxylic acid, 3-hydroxypropionic acid, a poly-amino-poly-carboxylic acid, and/or a salt of any acid. In certain embodiments, the carrier fluid includes a poly-amino-poly-carboxylic acid, and is a trisodium hydroxyl-ethyl-ethylene-diamine triacetate, mono-ammonium salts of hydroxyl-ethyl-ethylene-diamine triacetate, and/or mono-sodium salts of hydroxyl-ethyl-ethylene-diamine tetra-acetate. Further, the acids may be viscosified, e.g., gel-based, or emulsified in the carrier, e.g., an oil external phase.

In some embodiments the acidizing treatment fluid may be viscosified, e.g., a viscoelastic diverting acid (VDA), comprised of a gelling agent, or primary surfactant, for example certain surfactants such as betaines, optionally a pH-sensitive co-surfactant and/or alcohol, and an acid, are described, for instance, in U.S. Pat. No. 6,667,280, and US 2003/0119680, both of which are hereby incorporated herein in their entirety by these specific references thereto.

The main treatment fluid may be used in matrix treatments according to some embodiments herein by pumping the treatment fluid in contact with the formation at a pressure higher than the pore pressure. Simple flow-through injecting apparatuses such as perforations may also be used. In some embodiments, the composition may be delivered downhole in a bailer or in a tool comprising bailer and a perforation gun as described in US 2008/0196896 incorporated herewith by reference. Other ways of delivery of the treatment fluid can be envisioned for example with a wireline tool, a drill string, through a slickline, with a coiled tubing or microcoil, with a downhole tool or any type of other device introduced downhole and able to deliver the composition at a defined location. A microcoil or Microhole Coiled Tubing Drilling Rig (MCTR) is a tool capable of performing an entire "grass-roots" operation in the 0-5000 ft true vertical depth range including drilling and casing surface, intermediate, and production and liner holes.

Diverter Fluid

The treatment fluids containing the fibers and/or particulates in this disclosure for matrix treatment diversion are sometimes referred to herein as the "diverter fluid", the "second treatment fluid", or the like. This fluid contains the fibers, the acid precursor particles, or both. The modifier "second" does not necessarily indicate any particular importance, order, or relative characteristic, and is used herein solely to distinguish diverter fluids from the main or first treatment fluids described herein.

The carrier fluid used in the second treatment fluid can be acidic, but is non-acidic in most embodiments. The carrier fluid may be water: fresh water, produced water, seawater. Other non-limiting examples of carrier fluids include hydratable gels (e.g. guars, poly-saccharides, xanthan, hydroxy-ethyl-cellulose, etc.), a cross-linked hydratable gel, an energized fluid (e.g. an N2 or CO2 based foam), a viscoelastic surfactant fluid, and an oil-based fluid including a gelled, foamed, or otherwise viscosified oil. Additionally, the carrier fluid may be a brine, and/or may include a brine.

Acid Precursor Materials

The acid precursor particulates are embodied as having an average particle size as small as 1 micron or less, and as large as 1000 microns. In some embodiments, the acid precursor material is less than 200 microns, or less than 100 microns, e.g., 2-100 microns or 3-50 microns or 5-20 microns or 5-10 microns. The smaller sizes mentioned, e.g., 2-50 microns or 3-20 microns or 5-20 microns or 5-10 microns, can pass through a coiled tubing string with complex flow paths, very small exit ports, screens, etc. These smaller sizes are also capable of passing through the screens, gravel packs, or other mechanical sand control devices.

In some embodiments, the acid precursor material is unimodal and or may have a small particle size, e.g., 2-50 microns or 3-20 microns or 5-20 microns or 5-10 microns. In some embodiments, the acid precursor material is multimodal, as otherwise described herein.

The acid precursor material is used in the diverter fluid at a concentration sufficient to build a diverting barrier at the diversion location, based on the amount of fluid to be used in the diverter. The acid precursor loading in the diverter fluid may range from about 1 to about 3000 ppt, or from about 1 to about 1500 ppt, or from about 1 to about 750 ppt.

Non-limiting examples of degradable materials that may be used in both treatment fluids include certain polymer materials that are capable of generating acids upon degradation. These polymer materials may herein be referred to as "polymeric acid precursors." These materials are typically solids at room temperature. The polymeric acid precursor materials include the polymers and oligomers that hydrolyze or degrade in certain chemical environments under known and controllable conditions of temperature, time and pH to release organic acid molecules that may be referred to as "monomeric organic acids." As used herein, the expression "monomeric organic acid" or "monomeric acid" may also include dimeric acid or acid with a small number of linked monomer units that function similarly to monomer acids composed of only one monomer unit.

Polymer materials may include those polyesters obtained by polymerization of hydroxycarboxylic acids, such as the aliphatic polyester of lactic acid, referred to as polylactic acid; glycolic acid, referred to as polyglycolic acid; 3-hydroxbutyric acid, referred to as polyhydroxybutyrate; 2-hydroxyvaleric acid, referred to as polyhydroxyvalerate; epsilon caprolactone, referred to as polyepsilon caprolactone or polyprolactone; the polyesters obtained by esterification of hydroxyl aminoacids such as serine, threonine and tyrosine; and the copolymers obtained by mixtures of the monomers listed above. A general structure for the above-described homopolyesters is:

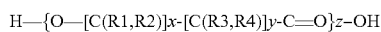

where,
R1, R2, R3, R4 is either H, linear alkyl, such as CH3, CH2CH3 (CH2)nCH3, branched alkyl, aryl, alkylaryl, a functional alkyl group (bearing carboxylic acid groups, amino groups, hydroxyl groups, thiol groups, or others) or a functional aryl group (bearing carboxylic acid groups, amino groups, hydroxyl groups, thiol groups, or others);
x is an integer between 1 and 11;
y is an integer between 0 and 10; and
z is an integer between 2 and 50,000.

In the appropriate conditions (pH, temperature, water content) polyesters like those described herein can hydrolyze and degrade to yield hydroxycarboxylic acid and compounds that pertain to those acids referred to in the foregoing as "monomeric acids."

One example of a suitable polymeric acid precursor, as mentioned above, is the polymer of lactic acid, sometimes called polylactic acid, "PLA", polylactate or polylactide. Lactic acid is a chiral molecule and has two optical isomers. These are D-lactic acid and L-lactic acid. The poly(L-lactic acid) and poly(D-lactic acid) forms are generally crystalline in nature. Polymerization of a mixture of the L- and D-lactic acids to poly(DL-lactic acid) results in a polymer that is more amorphous in nature. The polymers described herein are essentially linear. The degree of polymerization of the linear polylactic acid can vary from a few units (2-10 units) (oligomers) to several thousands (e.g. 2000-5000). Cyclic structures may also be used. The degree of polymerization of these cyclic structures may be smaller than that of the linear polymers. These cyclic structures may include cyclic dimers.

Another example is the polymer of glycolic acid (hydroxyacetic acid), also known as polyglycolic acid ("PGA"), or polyglycolide. Other materials suitable as polymeric acid precursors are all those polymers of glycolic acid with itself or other hydroxy-acid-containing moieties, as described in U.S. Pat. Nos. 4,848,467; 4,957,165; and 4,986,355, which are herein incorporated by reference.

The polylactic acid and polyglycolic acid may each be used as homopolymers, which may contain less than about 0.1% by weight of other comonomers. As used with reference to polylactic acid, "homopolymer(s)" is meant to include polymers of D-lactic acid, L-lactic acid and/or mixtures or copolymers of pure D-lactic acid and pure L-lactic acid. Additionally, random copolymers of lactic acid and glycolic acid and block copolymers of polylactic acid and polyglycolic acid may be used. Combinations of the described homopolymers and/or the above-described copolymers may also be used.

Other examples of polyesters of hydroxycarboxylic acids that may be used as polymeric acid precursors are the polymers of hydroxyvaleric acid (polyhydroxyvalerate), hydroxybutyric acid (polyhydroxybutyrate) and their copolymers with other hydroxycarboxylic acids. Polyesters resulting from the ring opening polymerization of lactones such as epsilon caprolactone (polyepsiloncaprolactone) or copolymers of hydroxyacids and lactones may also be used as polymeric acid precursors.

Polyesters obtained by esterification of other hydroxyl-containing acid-containing monomers such as hydroxyaminoacids may be used as polymeric acid precursors. Naturally occurring aminoacids are L-aminoacids. Among the 20 most common aminoacids the three that contain hydroxyl groups are L-serine, L-threonine, and L-tyrosine. These aminoacids may be polymerized to yield polyesters at the appropriate temperature and using appropriate catalysts by reaction of their alcohol and their carboxylic acid group. D-aminoacids are less common in nature, but their polymers and copolymers may also be used as polymeric acid precursors.

NatureWorks, LLC, Minnetonka, Minn., USA, produces solid cyclic lactic acid dimer called "lactide" and from it produces lactic acid polymers, or polylactates, with varying molecular weights and degrees of crystallinity, under the generic trade name NATUREWORKS™ PLA. The PLA's currently available from NatureWorks, LLC have number averaged molecular weights (Mn) of up to about 100,000 and weight averaged molecular weights (Mw) of up to about 200,000, although any polylactide (made by any process by any manufacturer) may be used. Those available from NatureWorks, LLC typically have crystalline melt temperatures of from about 120 to about 170° C., but others are obtainable. Poly(d,l-lactide) at various molecular weights is also commercially available from Bio-Invigor, Beijing and Taiwan. Bio-Invigor also supplies polyglycolic acid (also known as polyglycolide) and various copolymers of lactic acid and glycolic acid, often called "polyglactin" or poly(lactide-co-glycolide).

The extent of the crystallinity can be controlled by the manufacturing method for homopolymers and by the manufacturing method and the ratio and distribution of lactide and glycolide for the copolymers. Additionally, the chirality of the lactic acid used also affects the crystallinity of the polymer. Polyglycolide can be made in a porous form. Some of the polymers dissolve very slowly in water before they hydrolyze.

Amorphous polymers may be useful in certain applications. An example of a commercially available amorphous polymer is that available as NATUREWORKS 4060D PLA, available from NatureWorks, LLC, which is a poly(DL-lactic acid) and contains approximately 12% by weight of D-lactic acid and has a number average molecular weight (Mn) of approximately 98,000 g/mol and a weight average molecular weight (Mw) of approximately 186,000 g/mol.

Other polymer materials that may be useful are the polyesters obtained by polymerization of polycarboxylic acid derivatives, such as dicarboxylic acids derivatives with polyhydroxy containing compounds, in particular dihydroxy containing compounds. Polycarboxylic acid derivatives that may be used are those dicarboxylic acids such as oxalic acid, propanedioic acid, malonic acid, fumaric acid, maleic acid, succinic acid, glutaric acid, pentanedioic acid, adipic acid, phthalic acid, isophthalic acid, terphthalic acid, aspartic acid, or glutamic acid; polycarboxylic acid derivatives such as citric acid, poly and oligo acrylic acid and methacrylic acid copolymers; dicarboxylic acid anhydrides, such as, maleic anhydride, succinic anhydride, pentanedioic acid anhydride, adipic anhydride, phthalic anhydride; dicarboxylic acid halides, primarily dicarboxylic acid chlorides, such as propanedioic acyl chloride, malonyl chloride, fumaroyl chloride, maleyl chloride, succinyl chloride, glutaroyl chloride, adipoil chloride, phthaloyl chloride. Useful polyhydroxy containing compounds are those dihydroxy compounds such as ethylene glycol, propylene glycol, 1,4 butanediol, 1,5 pentanediol, 1,6 hexanediol, hydroquinone, resorcinol, bisphenols such as bisphenol acetone (bisphenol A) or bisphenol formaldehyde (bisphenol F); polyols such as glycerol. When both a dicarboxylic acid derivative and a dihydroxy compound are used, a linear polyester results. It is understood that when one type of dicarboxylic acid is used, and one type of dihydroxy compound is used, a linear homopolyester is obtained. When multiple types of polycarboxylic acids and/or polyhydroxy containing monomer are used copolyesters are obtained. According to the Flory Stockmayer kinetics, the "functionality" of the polycarboxylic acid monomers (number of acid groups per monomer molecule) and the "functionality" of the polyhydroxy containing monomers (number of hydroxyl groups per monomer molecule) and their respective concentrations, will determine the configuration of the polymer (linear, branched, star, slightly crosslinked or fully crosslinked). All these configurations can be hydrolyzed or "degraded" to carboxylic acid monomers, and therefore can be considered as polymeric acid precursors. As a particular case example, not willing to be comprehensive of all the possible polyester structures one can consider, but just to provide an indication of the general structure of the most simple case one can encounter, the general structure for the linear homopolyesters is:

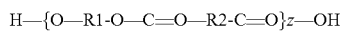

where,

R1 and R2, are linear alkyl, branched alkyl, aryl, alkylaryl groups; and z is an integer between 2 and 50,000.

Other examples of suitable polymeric acid precursors are the polyesters derived from phtalic acid derivatives such as polyethylenetherephthalate (PET), polybutylentetherephthalate (PBT), polyethylenenaphthalate (PEN), and the like.

In the appropriate conditions (pH, temperature, water content) polyesters like those described herein can "hydrolyze" and "degrade" to yield polycarboxylic acids and polyhydroxy compounds, irrespective of the original polyester being synthesized from either one of the polycarboxylic acid derivatives listed above. The polycarboxylic acid compounds the polymer degradation process will yield are also considered monomeric acids.

Other examples of polymer materials that may be used are those obtained by the polymerization of sulfonic acid derivatives with polyhydroxy compounds, such as polysulphones or phosphoric acid derivatives with polyhydroxy compounds, such as polyphosphates.

Such solid polymeric acid precursor material may be capable of undergoing an irreversible breakdown into fundamental acid products downhole. As referred to herein, the term "irreversible" will be understood to mean that the solid polymeric acid precursor material, once broken downhole, should not reconstitute while downhole, e.g., the material should break down in situ but should not reconstitute in situ. The term "break down" refers to both the two relatively extreme cases of hydrolytic degradation that the solid polymeric acid precursor material may undergo, e.g., bulk erosion and surface erosion, and any stage of degradation in between these two. This degradation can be a result of, inter alia, a chemical reaction. The rate at which the chemical reaction takes place may depend on, inter alia, the chemicals added, temperature and time. The breakdown of solid polymeric acid precursor materials may or may not depend, at least in part, on its structure. For instance, the presence of hydrolyzable and/or oxidizable linkages in the backbone often yields a material that will break down as described herein. The rates at which such polymers break down are dependent on factors such as, but not limited to, the type of repetitive unit, composition, sequence, length, molecular geometry, molecular weight, morphology (e.g., crystallinity, size of spherulites, and orientation), hydrophilicity, hydrophobicity, surface area, and additives. The manner in which the polymer breaks down also may be affected by the environment to which the polymer is exposed, e.g., temperature, presence of moisture, oxygen, microorganisms, enzymes, pH, and the like.

Some suitable examples of solid polymeric acid precursor material that may be used include, but are not limited to, those described in the publication of Advances in Polymer Science, Vol. 157 entitled "Degradable Aliphatic Polyesters," edited by A. C. Albertsson, pages 1-138. Examples of polyesters that may be used include homopolymers, random, block, graft, and star- and hyper-branched aliphatic polyesters.

Another class of suitable solid polymeric acid precursor material that may be used includes polyamides and polyimides. Such polymers may comprise hydrolyzable groups in the polymer backbone that may hydrolyze under the conditions that exist in cement slurries and in a set cement matrix. Such polymers also may generate byproducts that may become sorbed into a cement matrix. Calcium salts are a non-limiting example of such byproducts. Non-limiting examples of suitable polyamides include proteins, polyaminoacids, nylon, and poly(caprolactam). Another class of polymers that may be suitable for use are those polymers that may contain hydrolyzable groups, not in the polymer backbone, but as pendant groups. Hydrolysis of the pendant groups may generate a water-soluble polymer and other byproducts that may become sorbed into the cement composition. A non-limiting example of such a polymer includes polyvinylacetate, which upon hydrolysis forms water-soluble polyvinylalcohol and acetate salts.

The degradable particulates may further comprise a stabilizer such as a carbodiimide or a hydrolysis accelerator such as a metal salt, in embodiments the accelerator may be a lightly burnt magnesium oxide. In some embodiments the acid precursor material may contain or be used in a treatment fluid with a pH control agent as disclosed in U.S. Pat. No. 7,219,731, which is hereby incorporated herein by reference.

The particle(s) can be embodied as material reacting with chemical agents. Some examples of materials that may be removed by reacting with other agents are carbonates including calcium and magnesium carbonates and mixtures thereof (reactive to acids and chelates); acid soluble cement (reactive to acids); polyesters including esters of lactic hydroxylcarbonic acids and copolymers thereof (can be hydrolyzed with acids and bases).

In embodiments, the acid precursor particulates, after the diverter plug is placed and such particulates degrade, an acid is released providing or improving an acid treatment at the formation surface adjacent the diverter plug. When degradable fibers of an acid precursor are added to the diverter fluid, the concentration of acid generated during degradation of both the particles and the fibers makes the acid treatment even more efficient.

Fibers

As mentioned when fibers are present in the fluid, i.e. the diverter fluid contains fibers, said fibers are optional in the first treatment fluid; said fibers may be straight, curved, bent or undulated. Other non-limiting shapes may include hollow, generally spherical, rectangular, polygonal, etc. Fibers or elongated particles may be used in bundles. The fibers may have a length from about 20 nm to about 10 mm and a diameter of from about 5 nm to about 100 µm; or the fibers can have a length from about 1 mm to about 10 mm or from about 1 mm to about 6 mm or from about 1 mm to about 3 mm and a diameter from about 1 µm to about 100 µm or from about 1 µm to about 50 µm or from about 1 µm to about 25 µm; or the fibers can have a length from about 20 nm to about 1 mm or from about 50 nm to about 1 mm or from about 100 nm to about 1 mm and a diameter from about 5 nm to about 1 µm or from about 5 nm to about 500 nm or from about 5 nm to about 50 nm.

In embodiments, the fibers are used in the diverter fluid or delivery slurry, separately or together with the acid precursor particulates, at a concentration sufficient to build a barrier at the diversion location, depending on the relative size or volume of larger openings that must be plugged based on the amount of fluid to be used to place the fibers in the desired location. The fiber loading in the diverter fluid may range from about 0.12 g/L (about 1 ppt) to about 18 g/L (about 150 ppt), for example from about 0.12 g/m3 (about 1 ppt) to about 6 g/L (about 50 ppt). The proportion and physical dimensions of the fiber, and the particular fiber utilized, depend on a number of variables, including the characteristics of the diverter or treatment fluid, and the chemical and physical characteristics of the formation. For instance, longer fibers may be utilized in formations that are highly fractured and/or in which the naturally occurring fractures are quite large, and it may be advantageous to utilize higher concentrations of such fibers for use in such formations. On the other hand, smaller fibers and lower concentrations may be preferred when working with coiled tubing, screens, gravel packs, or other small flow passage situations.

The fiber may be formed from a degradable material or a non-degradable material. The fiber may be organic or inorganic. Non-degradable materials are those wherein the fiber remains substantially in its solid form within the well fluids. Examples of such materials include cellulose, glass, ceramics, basalt, carbon and carbon-based compound, metals and metal alloys, etc. Polymers and plastics that are non-degradable may also be used as non-degradable fibers. These may include high-density plastic materials that are acid and oil-resistant and exhibit a crystallinity of greater than 10%. Other non-limiting examples of polymeric materials include nylons, acrylics, styrenes, polyesters, polyethylene, oil-resistant thermoset resins and combinations of these.

Degradable fibers may include those materials that can be softened, dissolved, reacted or otherwise made to degrade within the well fluids. Such materials may be soluble in aqueous fluids or in hydrocarbon fluids. Oil-degradable particulate materials may be used that degrade in the produced fluids. Non-limiting examples of degradable materials may include, without limitation, polyvinyl alcohol, polyethylene terephthalate (PET), polyethylene, dissolvable salts, polysaccharides, waxes, benzoic acid, naphthalene based materials, magnesium oxide, sodium bicarbonate, calcium carbonate, sodium chloride, calcium chloride, ammonium sulfate, soluble resins, and the like, and combinations of these. Degradable materials may also include those that are formed from solid-acid precursor materials. These materials may include polylactic acid (PLA), polyglycolic acid (PGA), carboxylic acid, lactide, glycolide, copolymers of PLA or PGA, and the like, and combinations of these. Such materials may also further facilitate the dissolving of the formation in the acid fracturing treatment. When degradable fibers are being used, they may optionally also be a compounded material containing the stabilizer.

In embodiments, the fibers comprise a second acid precursor material, which may be the same or different with respect to the acid precursor particulates. In embodiments, the fibers in the first fluid are degradable fibers made of acid precursors, when the fluid is place and such fiber degrade, an acid is released providing or improving an acid treatment at the formation surface adjacent the diverter plug. When degradable particles of an acid precursors are added to the diverter fluid, the concentration of acid generated during degradation of both the particles and the fibers makes the acid treatment even more efficient.

Also, fibers can be any fibrous material, such as, but not necessarily limited to, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON polyethylene terephthalate (PET) fibers available from Invista Corp., Wichita, Kans., USA, 67220. Other examples of useful fibers include, but are not limited to, polylactic acid polyester fibers, polyglycolic acid polyester fibers, polyvinyl alcohol fibers, and the like.

Viscosifying Agents

In certain further embodiments, the second treatment fluid carrier fluid contains a viscosifying agent. The viscosifying agent may be any crosslinked polymers. The polymer viscosifier can be a metal-crosslinked polymer. Suitable polymers for making the metal-crosslinked polymer viscosifiers include, for example, polysaccharides such as substituted galactomannans, such as guar gums, high-molecular weight polysaccharides composed of mannose and galactose sugars, or guar derivatives such as hydroxypropyl guar (HPG), carboxymethylhydroxypropyl guar (CMHPG) and carboxymethyl guar (CMG), hydrophobically modified guars, guar-containing compounds, and synthetic polymers. Crosslinking agents based on boron, titanium, zirconium or aluminum complexes are typically used to increase the effective molecular weight of the polymer and make them better suited for use in high-temperature wells.

Other suitable classes of polymers effective as viscosifying agent include polyvinyl polymers, polymethacrylamides, cellulose ethers, lignosulfonates, and ammonium, alkali metal, and alkaline earth salts thereof. More specific examples of other typical water-soluble polymers are methacrylamide copolymers, polyacrylamides, partially hydrolyzed polyacrylamides, partially hydrolyzed polymethacrylamides, polyvinyl alcohol, polyalkyleneoxides, other galactomannans, heteropolysaccharides obtained by the fermentation of starch-derived sugar and ammonium and alkali metal salts thereof.

Cellulose derivatives are used to a smaller extent, such as hydroxyethylcellulose (HEC) or hydroxypropylcellulose (HPC), carboxymethylhydroxyethylcellulose (CMHEC) and carboxymethycellulose (CMC), with or without crosslinkers. Xanthan, diutan, and scleroglucan, three biopolymers, have been shown to have excellent particulate-suspension ability even though they are more expensive than guar derivatives and therefore have been used less frequently, unless they can be used at lower concentrations.

In other embodiments, the viscosifying agent is made from a crosslinkable, hydratable polymer and a delayed crosslinking agent, wherein the crosslinking agent comprises a complex comprising a metal and a ligand. Also the crosslinked polymer can be made from a polymer comprising pendant ionic moieties, a surfactant comprising oppositely charged moieties, a clay stabilizer, a borate source, and a metal crosslinker. Said embodiments are described in U.S. Patent Publications US2008-0280790 and US2008-0280788 respectively, each of which are incorporated herein by reference.

Viscoelastic Surfactant Systems

The viscosifying agent may be a viscoelastic surfactant (VES). The VES may be selected from the group consisting of cationic, anionic, zwitterionic, amphoteric, nonionic and combinations thereof. Some non-limiting examples are those cited in U.S. Pat. No. 6,435,277 (Qu et al.) and U.S. Pat. No. 6,703,352 (Dahayanake et al.), each of which are incorporated herein by reference. The viscoelastic surfactants, when used alone or in combination, are capable of forming micelles that form a structure in an aqueous environment that contribute to the increased viscosity of the fluid (also referred to as "viscosifying micelles"). These fluids are normally prepared by mixing in appropriate amounts of VES suitable to achieve the desired viscosity. The viscosity of VES fluids may be attributed to the three dimensional structure formed by the components in the fluids. When the concentration of surfactants in a viscoelastic fluid significantly exceeds a critical concentration, and in most cases in the presence of an electrolyte, surfactant molecules aggregate into species such as micelles, which can interact to form a network exhibiting viscous and elastic behavior.

In general, particularly suitable zwitterionic surfactants have the formula:

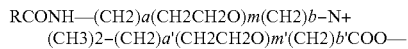

RCONH—(CH2)a(CH2CH2O)m(CH2)b–N+
(CH3)2–(CH2)a'(CH2CH2O)m'(CH2)b'COO— in which R is an alkyl group that contains from about 11 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to 10 if m is 0; a' and b' are each 1 or 2 when m' is not 0 and (a'+b') is from 1 to 5 if m is 0; (m+m') is from 0 to 14; and CH2CH2O may also be OCH2CH2. In some embodiments, zwitterionic surfactants of the family of betaine is used.

Exemplary cationic viscoelastic surfactants include the amine salts and quaternary amine salts disclosed in U.S. Pat. Nos. 5,979,557, and 6,435,277 which are hereby incorporated by reference. Examples of suitable cationic viscoelastic surfactants include cationic surfactants having the structure:

R1N+(R2)(R3)(R4)X− in which R1 has from about 14 to about 26 carbon atoms and may be branched or straight chained, aromatic, saturated or unsaturated, and may contain a carbonyl, an amide, a retroamide, an imide, a urea, or an amine; R2, R3, and R4 are each independently hydrogen or a C1 to about C6 aliphatic group which may be the same or different, branched or straight chained, saturated or unsaturated and one or more than one of which may be substituted with a group that renders the R2, R3, and R4 group more hydrophilic; the R2, R3 and R4 groups may be incorporated into a heterocyclic 5- or 6-member ring structure which includes the nitrogen atom; the R2, R3 and R4 groups may be the same or different; R1, R2, R3 and/or R4 may contain one or more ethylene oxide and/or propylene oxide units; and X— is an anion. Mixtures of such compounds are also suitable. As a further example, R1 is from about 18 to about 22 carbon atoms and may contain a carbonyl, an amide, or an amine, and R2, R3, and R4 are the same as one another and contain from 1 to about 3 carbon atoms.

Amphoteric viscoelastic surfactants are also suitable. Exemplary amphoteric viscoelastic surfactant systems include those described in U.S. Pat. No. 6,703,352, for example amine oxides. Other exemplary viscoelastic surfactant systems include those described in U.S. Pat. Nos. 6,239,183; 6,506,710; 7,060,661; 7,303,018; and 7,510,009 for example amidoamine oxides. These references are hereby incorporated in their entirety. Mixtures of zwitterionic surfactants and amphoteric surfactants are suitable. An example is a mixture of about 13% isopropanol, about 5% 1-butanol, about 15% ethylene glycol monobutyl ether, about 4% sodium chloride, about 30% water, about 30% cocoamidopropyl betaine, and about 2% cocoamidopropylamine oxide.

The viscoelastic surfactant system may also be based upon any suitable anionic surfactant. In some embodiments, the anionic surfactant is an alkyl sarcosinate. The alkyl sarcosinate can generally have any number of carbon atoms. Alkyl sarcosinates can have about 12 to about 24 carbon atoms. The alkyl sarcosinate can have about 14 to about 18 carbon atoms. Specific examples of the number of carbon atoms include 12, 14, 16, 18, 20, 22, and 24 carbon atoms. The anionic surfactant is represented by the chemical formula:

R1CON(R2)CH2X wherein R1 is a hydrophobic chain having about 12 to about 24 carbon atoms, R2 is hydrogen, methyl, ethyl, propyl, or butyl, and X is carboxyl or sulfonyl. The hydrophobic chain can be an alkyl group, an alkenyl group, an alkylarylalkyl group, or an alkoxyalkyl group. Specific examples of the hydrophobic chain include a tetradecyl group, a hexadecyl group, an octadecentyl group, an octadecyl group, and a docosenoic group.

The second fluid as described generally functions as a diverting agent and promotes the re-direction of the subsequent stage or stages of fluids to another region of the wellbore, further contributing to improving the quality of the wellbore treatment. In a matrix treatment, the first and second fluids in this configuration are pumped below the fracturing pressure of the formation to avoid fracturing the formation since the objective is a matrix treatment; following the first treatment fluid, the second treatment fluid is pumped down to create a diverting plug in the near wellbore area; another step of pumping the first treatment fluid will be achieved to treat the rock in another location and subsequent operations will be repeated in order to maximize the wellbore coverage and efficiency. Once the matrix treatment operations are finished, the acid precursor material in the wellbore plug will degrade thus releasing the acid and assist cleanup of the near wellbore area thus improving the conductivity.

In some embodiments the second fluid is not acidic to avoid damage to the near wellbore area and/or premature restoration of conductivity in the plugged zone; indeed, the first fluid that is used may need time to effect treatment, e.g., acidization in the case of matrix acidizing, or resin curing in the case of consolidating treatments, and the near wellbore area being "plugged" will enable this phenomenon. When the downhole conditions trigger the degradation of the acid precursor material, the flowback of the first treatment fluid in conjunction with the degradation of the acid precursors in the non-acidic treatment fluid (second fluid) will clean the near wellbore area thus maximizing the conductivity.

Methods of wellsite and downhole delivery of the composition are the same or similar as for existing particulate diverting materials. Typically such particulate materials are introduced in the pumping fluid and then displaced into the formation through perforations, gravel packs, screens, etc. The list of injecting equipment may include various dry additive systems, flow-through blenders etc. In one embodiment the blends of particles may be batch mixed and then introduced into the treating fluid in slurried form.

Compositions

Even if the first and second fluids have specific features to achieve their goals, some of the chemicals involved in both fluid may share similar properties. Material that can be used indifferently in both treatment fluid will be disclosed here after.

In some embodiments, Both treatment fluids may optionally further comprise additional additives, including, but not limited to fluid loss control additives, gas, foaming agents, stabilizers, corrosion inhibitors, scale inhibitors, catalysts, clay control agents, biocides, friction reducers, combinations thereof and the like. For example, in some embodiments, it may be desired to foam the composition using a gas, such as air, nitrogen, or carbon dioxide.

The compounded material(s) may further include a plasticizer, nucleation agent, flame retardant, antioxidant agent, or desiccant.

Even if the disclosure was mostly directed towards cased hole treatment, the present technology is equally applicable to open hole treatments.

To facilitate a better understanding, the following examples of embodiments are given. In no way should the following examples be read to limit, or define, the scope of the overall disclosure.

EXAMPLES

Example 1

Figure 6:
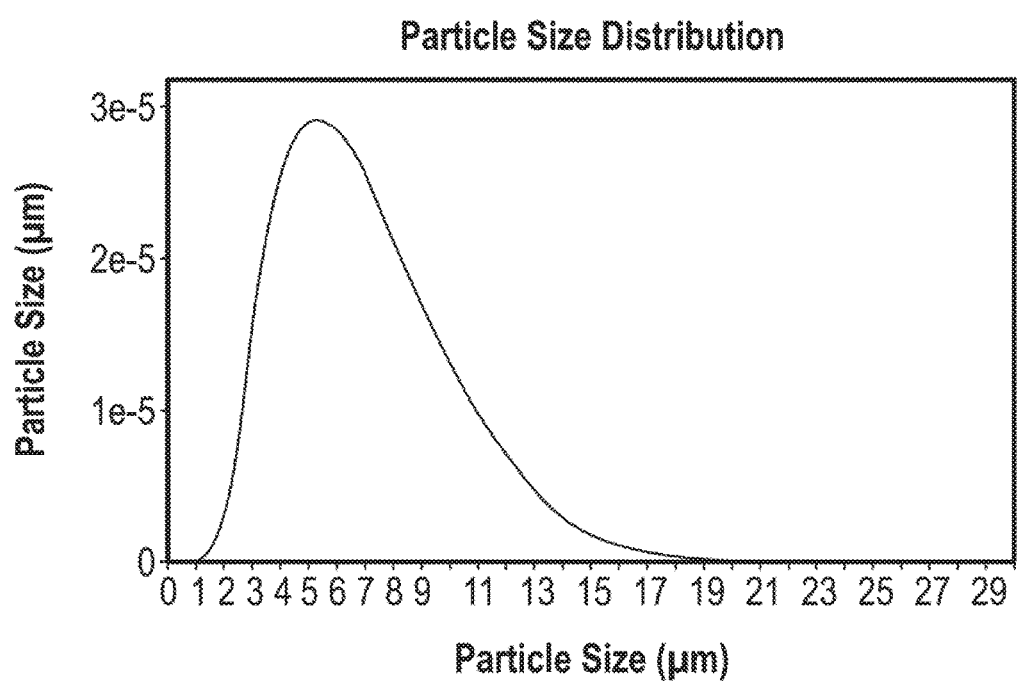
FIG. 6 is a plot of the particle size distribution of the acid precursor particles of Example 1 below according to some embodiments of the disclosure.

Acid precursor particles comprising PLA and having an average particle size of 5 microns were evaluated for particle size distribution using a Coulter counter. FIG. 6 is a particle size distribution diagram for acid precursor diversion particles that can be suitably employed according to some embodiments of the disclosure. The diagram shows a particle size distribution mode of 5-6 microns that is sufficiently small to be supplied to a zone in the formation through coiled tubing, screen, gravel pack, etc. to form a diverter plug.

Example 2

Figure 7:
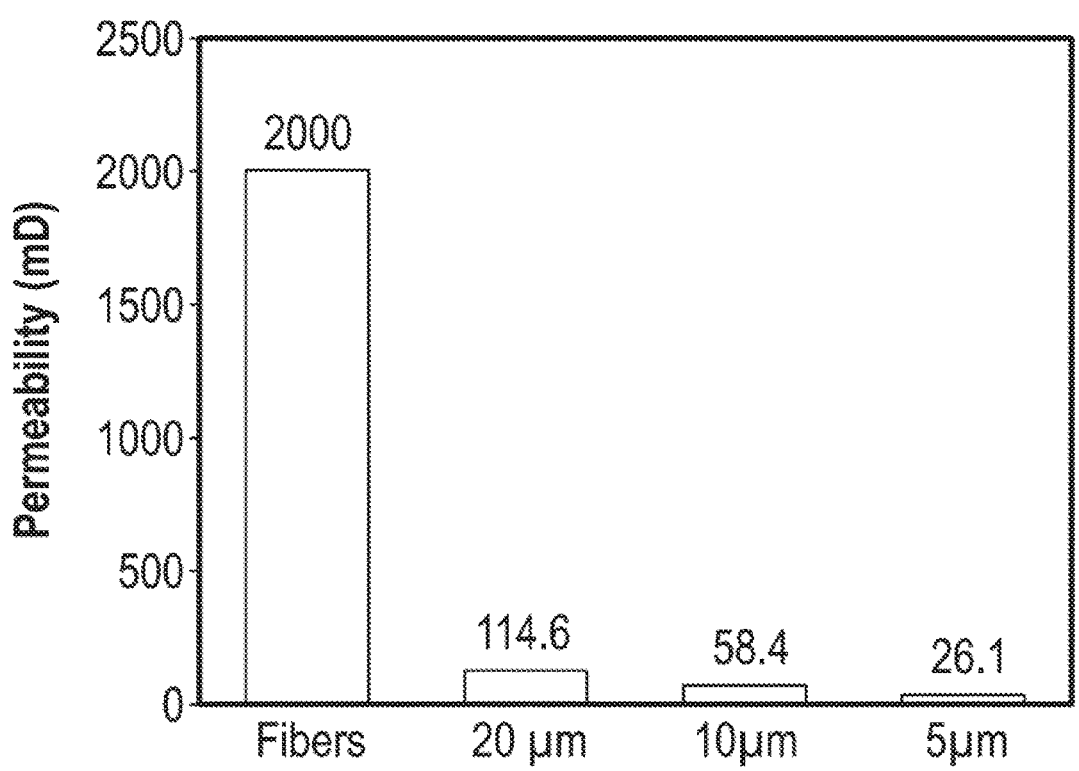
FIG. 7 is a graph comparing the permeability of some examples of fibers and acid precursor particulates used in Example 2 below according to some embodiments of the present disclosure.

FIG. 7 is a graph comparing the permeability of some examples of fibers and the acid precursor particulates that can be suitably used in methods according to some embodiments of the present disclosure. The permeability of the fibers alone is 2000 mD, whereas that of the acid precursor particles having an average size of 20 microns is 114.6 mD, 10-micron acid precursor particles 58.4 mD, and the 5-micron acid precursor particles (Example 1) 26.1 mD.

Example 3

Figure 8:
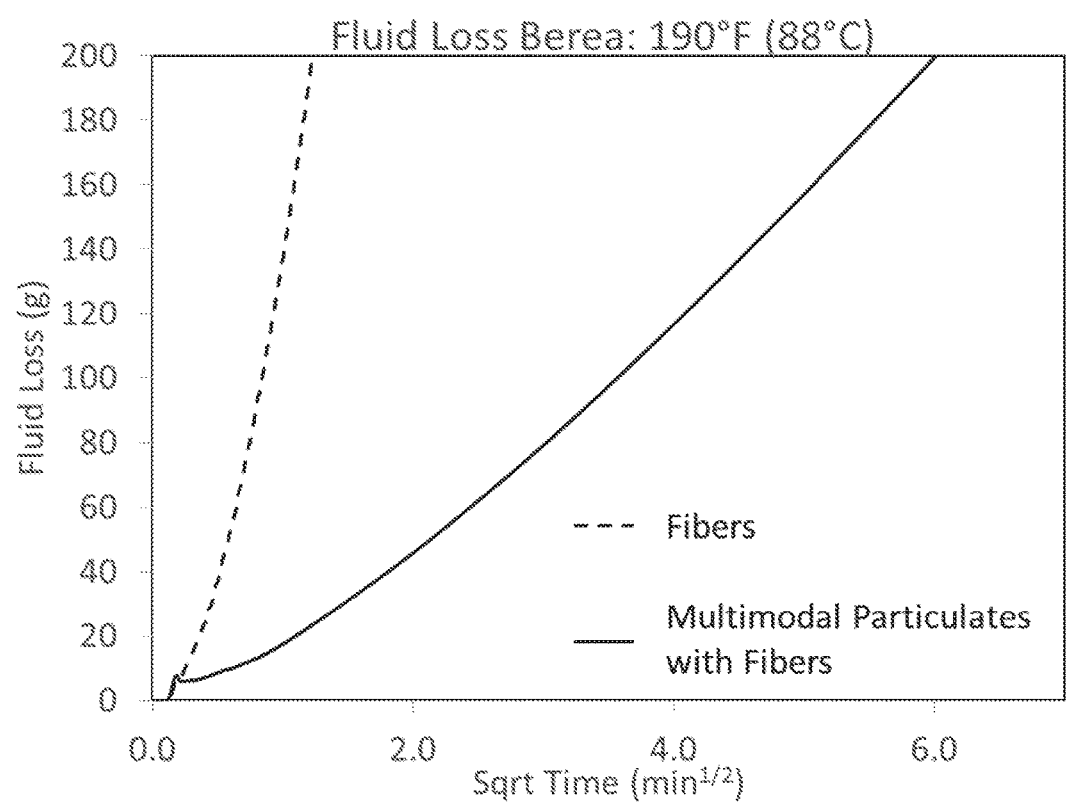
FIG. 8 is a graph comparing the fluid loss (Berea sandstone) of some comparative and exemplary fibers and acid precursor particulates used in Example 3 below according to some embodiments of the present disclosure.

A multimodal blend of PLA (150 ppt) was mixed with 25 ppt of fibers and tested in a fluid loss cell. The fluid loss performance was compared to a sample containing fibers alone. FIG. 8 is a graph comparing the fluid loss performance of the multimodal PLA blend with a fiber sample on approximately 500 mD Berea sandstone cores in the fluid loss cell at 88° C. (190° F.). Fluid loss was much better (reduced) for the acid precursor particles.

Example 4

Figure 9:
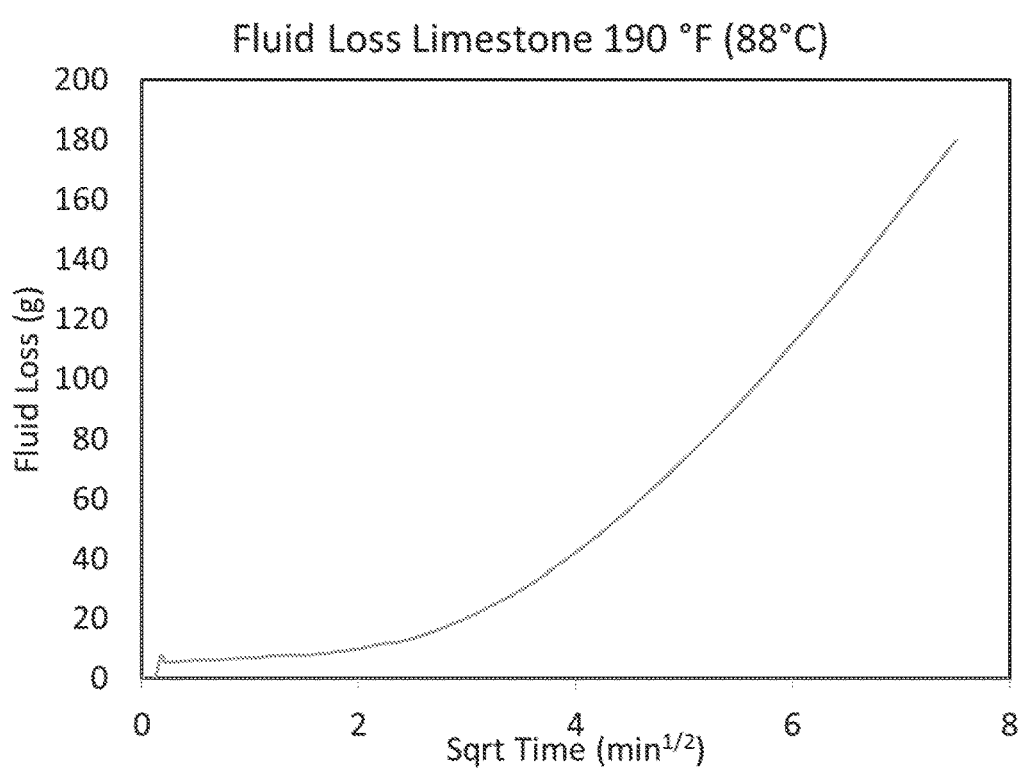
FIG. 9 is a graph of the fluid loss (Indiana limestone) of exemplary acid precursor particulates used in Example 4 below according to some embodiments of the present disclosure.

A sample of 5 µm of PLA (from Example 1) was also tested in a slurry at 930 ppt in the fluid loss cell of Example 3 with a 70 mD Indiana limestone core at 88° C. (190° F.). As seen in FIG. 9, the particles showed similar fluid loss performance to the multimodal mixture in Example 3. The core from this test following treatment with the particles was heated in brine for a period of time at 93° C. (200° F.) and the core was then tested for regained permeability. A similar fluid loss test was performed at 121° C. (250° F.) and the core was heated in the same fashion. The permeability results of these tests are presented in the following table:

| Temperature | Initial Perm (mD) | Regained Perm After Heating (mD) |
| --- | --- | --- |
| 88° C. (190° F.) | 31 | 52 |
| 121° C. (250° F.) | 138 | 198 |

In both cases, heating the core after the fluid loss test improved the permeability, thought to be the result of the acid release from the particles and reaction with the limestone core material.

The foregoing disclosure and description is illustrative and explanatory, and it can be readily appreciated by those skilled in the art that various changes in the size, shape and materials, as well as in the details of the illustrated construction or combinations of the elements described herein can be made without departing from the spirit of the disclosure.

What is claimed is:

1. A method to treat a subterranean formation penetrated by a wellbore, comprising:
    pumping a first amount of a treatment fluid in the wellbore into a first zone of the subterranean formation;
    placing fibers and a first amount of a first acid precursor material in the wellbore to form a diverting barrier and selectively reduce hydraulic conductivity between the first zone and the wellbore, wherein the first acid precursor material has a first average particle size of about 1000 microns or less;
    pumping a second amount of the first treatment fluid in the wellbore;
    diverting the second amount of the first treatment fluid from the first zone to a second zone; and
    at least partially restoring the hydraulic conductivity between the first zone and the wellbore through at least the partial removal of the diverting barrier,
    wherein the placement of the fibers and the first amount of the first acid precursor material comprises pumping a treatment stage comprising alternating slugs of a first slurry comprising the first acid precursor material alternated with a second slurry comprising the fibers.

2. The method of claim 1, wherein the placement of the fibers and the first acid precursor material comprises pumping a slurry comprising a mixture of the fibers and the first acid precursor material.

3. The method of claim 2, wherein the fibers are present in the slurry at a concentration of from about 1 to 150 ppt.

4. The method of claim 1, further comprising deploying a coiled tubing assembly in the well and wherein placing the fibers and the first acid precursor material comprises pumping a slurry of one or a combination of the fibers and the first acid precursor material through a flow path defined by the coiled tubing.

5. The method of claim 4, wherein deploying a coiled tubing assembly comprises deploying a coiled tubing assembly having a fiber optic tether disposed in the flow path of the coiled tubing and further comprising taking distributed measurements from the fiber optic tether during one or more of:
  i) the pumping of the first amount of the treatment fluid,
  ii) the pumping of the second amount of the treatment fluid,
  iii) the pumping of the slurry,
  iv) the diversion of the second amount of the first treatment fluid, and
  v) the at least partial restoring of the hydraulic conductivity between the first zone and the wellbore through at least the partial removal of the diverting barrier, to observe the behavior of the treatment fluids placed in the subterranean formation.

6. The method of claim 1, wherein the placement of the fibers and the first acid precursor comprises pumping a first slurry of the first acid precursor material through a coiled tubing, and pumping a second slurry of the fibers in an annulus between the wellbore and the coiled tubing.

7. The method of claim 1 wherein the fibers and the first amount of the first acid precursor material are placed in the wellbore simultaneously with the first amount of the treatment fluid.

8. The method of claim 1, further comprising pumping the first amount of the first acid precursor material through a screen, a gravel pack, or a combination thereof.

9. The method of claim 1, wherein the first acid precursor material has a multimodal particle size distribution.

10. The method of claim 1, wherein the fibers comprise a second acid precursor material selected from the group consisting of polylactic acid, polyglycolic acid, copolymers of lactic and glycolic acids, and combinations thereof.

11. The method of claim 1, wherein the fibers comprise a non-degradable material.

12. The method of claim 1 wherein the first acid precursor material is selected from the group consisting of polylactic acid, polyglycolic acid, copolymers of lactic and glycolic acids, and combinations thereof.

13. A method to treat a subterranean formation penetrated by a wellbore, comprising:
  providing a first treatment fluid;
  pumping a plurality of stages of the first treatment fluid in the wellbore into a plurality of respective zones of the formation;
  providing a second treatment fluid comprising a carrier fluid, an acid precursor material having a first average particle size of about 1000 microns, and fibers;
  alternately pumping in the wellbore respective stages of the second treatment fluid between sequentially preceding and subsequent ones of the stages of the first treatment fluid to form diverting barriers to reduce hydraulic conductivity between respective preceding and subsequent ones of the zones and the wellbore;
  diverting the subsequent ones of the first treatment fluid stages from a respective preceding zone to a respective subsequent zone;
  after a final stage of the second treatment fluid, pumping a final stage of the first treatment fluid in the wellbore of the formation and diverting the final stage of the first treatment fluid to a final one of the zones; and
  at least partially restoring the hydraulic conductivity between at least one of the plurality of zones and the wellbore through at least the partial removal of at least one of the diverting barriers.

14. The method of claim 13, wherein the second treatment fluid is a slurry comprising a mixture of the fibers and the first acid precursor material.

15. The method of claim 14, further comprising deploying a coiled tubing assembly in the well and wherein the second treatment fluid is pumped through a flow path defined by the coiled tubing.

16. The method of claim 13, wherein the fibers are present in the second treatment fluid at a concentration of from about 1 to 150 ppt.

17. The method of claim 13, wherein deploying a coiled tubing assembly comprises deploying a coiled tubing assembly having a fiber optic tether disposed in the flow path of the coiled tubing and further comprising taking measurements from a fiber optic tether during one or more of:
  i) the pumping of a plurality of stages of the first treatment fluid,
  ii) the pumping of the respective stages of the second treatment fluid,
  iii) the diverting of the subsequent ones of the first treatment fluid stages, and
  iv) the at least partial restoring of the hydraulic conductivity between at least one of the plurality of zones and the wellbore through at least the partial removal of at least one of the diverting barriers, to observe the behavior of the first and second treatment fluids placed in the subterranean formation.

18. The method of claim 13, wherein the first acid precursor material has a multimodal particle size distribution.

19. The method of claim 13 wherein the first acid precursor material is selected from the group consisting of polylactic acid, polyglycolic acid, copolymers of lactic and glycolic acids, and combinations thereof.

* * * * *